United States Patent
Watanabe et al.

(10) Patent No.: US 11,221,522 B2
(45) Date of Patent: Jan. 11, 2022

(54) LIQUID CRYSTAL PANEL

(71) Applicant: Sharp Kabushiki Kaisha, Sakai (JP)

(72) Inventors: Kouichi Watanabe, Sakai (JP); Shinichi Terashita, Sakai (JP); Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/533,829

(22) Filed: Aug. 7, 2019

(65) Prior Publication Data

US 2020/0064696 A1 Feb. 27, 2020

Related U.S. Application Data

(60) Provisional application No. 62/722,201, filed on Aug. 24, 2018.

(51) Int. Cl.
*G02F 1/1337* (2006.01)
*G02F 1/1343* (2006.01)
*G02F 1/1368* (2006.01)

(52) U.S. Cl.
CPC ...... *G02F 1/133753* (2013.01); *G02F 1/1343* (2013.01); *G02F 1/1368* (2013.01)

(58) Field of Classification Search
CPC .................. G02F 1/1368; G02F 1/1343; G02F 1/133753; G02F 1/1362; G02F 1/134345
See application file for complete search history.

(56) References Cited

U.S. PATENT DOCUMENTS

| 2006/0146243 A1* | 7/2006 | Nakanishi ......... G02F 1/133707 349/139 |
| 2007/0024786 A1* | 2/2007 | Tanaka .............. G02F 1/133707 349/139 |
| 2015/0036073 A1 | 2/2015 | Im et al. |
| 2018/0314114 A1 | 11/2018 | Shimoshikiryoh et al. |

FOREIGN PATENT DOCUMENTS

| CN | 108351557 A | 7/2018 |
| JP | 2015-31961 A | 2/2015 |

* cited by examiner

*Primary Examiner* — Dung T Nguyen

(74) *Attorney, Agent, or Firm* — Keating & Bennett, LLP

(57) ABSTRACT

A liquid crystal panel including: a first substrate with a first alignment film; a liquid crystal layer; and a second substrate with a second alignment film. The first and second alignment films are alignment treated such that pixels each include first to fourth domains with different alignment vectors in a column direction, each alignment vector being defined as lying from a first substrate side long-axis end as a start point to a second substrate side long-axis end as an end point. Each pixel electrode has first fine slits parallel to the alignment vector of the second domain in the second domain, second fine slits parallel to the alignment vector of the third domain in the third domain, and a central slit along a boundary between the second domain and the third domain at the boundary. The first fine slits and the second fine slits are connected via the central slit.

16 Claims, 22 Drawing Sheets

FIG.5
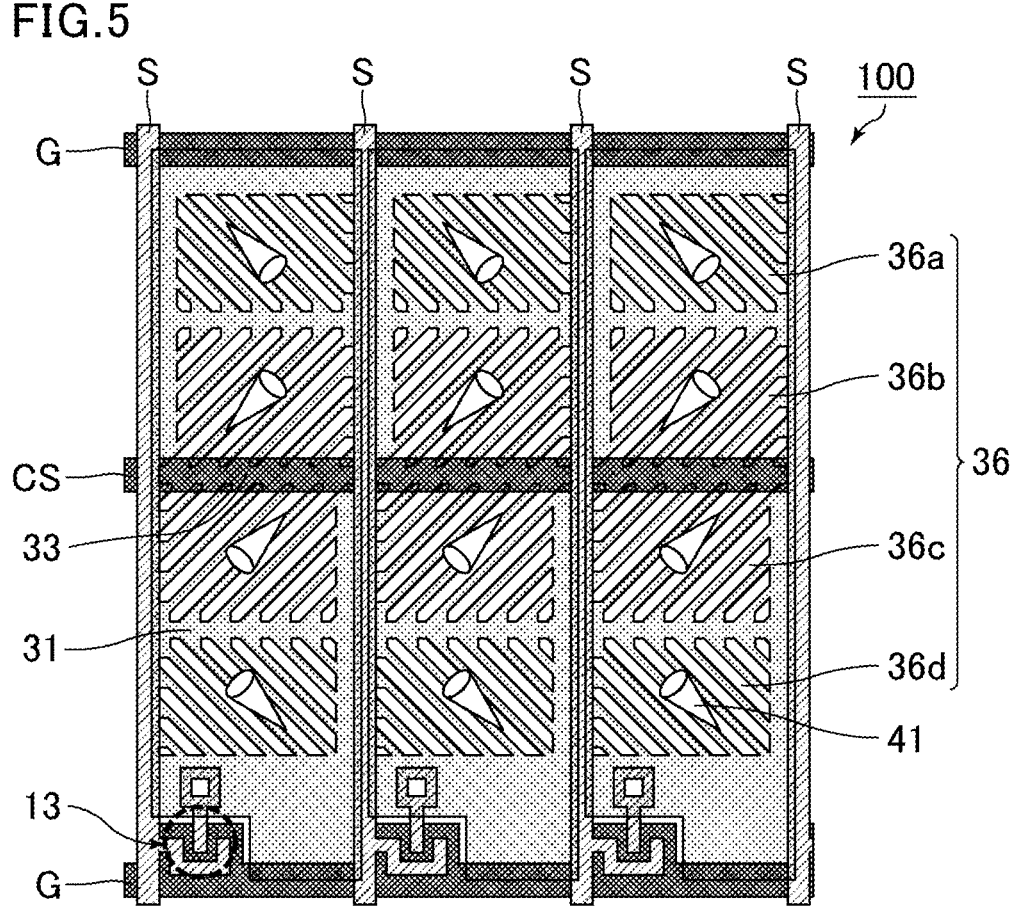
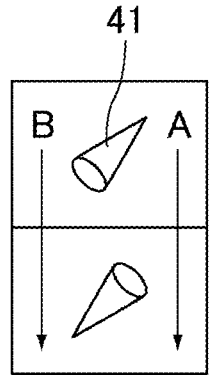
FIG.6A
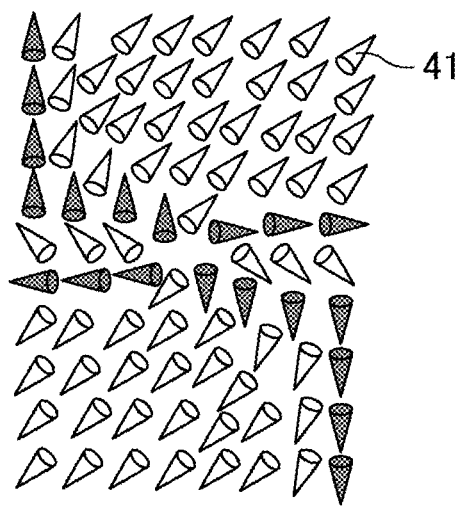
FIG.6B
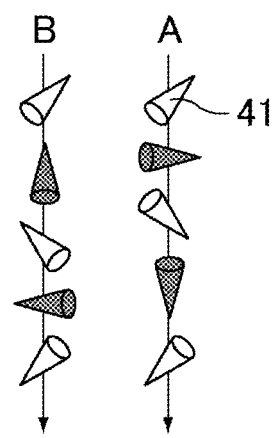
FIG.6C

Potential

Potential

FIG.15

| 180μm Pitch | Line / μm | | | | | | | | |
|---|---|---|---|---|---|---|---|---|---|
| Space / μm | | 2.1 | 2.5 | 2.8 | 2.9 | 3.4 | 3.5 | 3.9 | 4.5 | 4.9 |
| | 3.1 | 100.0% | | | 97.9% | | | 92.3% | | 88.7% |
| | 3.5 | | 96.2% | | | | 91.8% | | 88.3% | |
| | 3.9 | 94.7% | | | | | | | | |
| | 4.1 | | | | | | | | 82.2% | |
| | 4.2 | | | 87.0% | | | | | | |
| | 4.6 | | | | | 78.8% | | | | |
| | 4.9 | 79.8% | | | | | | | | |
| | 5.2 | | | 72.3% | | | | | | |
| | 5.9 | 64.3% | | | | | | | | |

FIG.16

| 240μm Pitch | Line / μm | | | | | | | | |
|---|---|---|---|---|---|---|---|---|---|
| Space / μm | | 2.1 | 2.5 | 2.8 | 2.9 | 3.4 | 3.5 | 3.9 | 4.5 | 4.9 |
| | 3.1 | 100.0% | | | 99.6% | | | 95.5% | | 91.1% |
| | 3.5 | | 97.1% | | | | 93.8% | | 88.0% | |
| | 3.9 | 96.3% | | | | | | | | |
| | 4.1 | | | | | | | | 83.9% | |
| | 4.2 | | | 88.4% | | | | | | |
| | 4.6 | | | | | 78.1% | | | | |
| | 4.9 | 81.3% | | | | | | | | |
| | 5.2 | | | 72.6% | | | | | | |
| | 5.9 | 65.3% | | | | | | | | |

LIQUID CRYSTAL PANEL

CROSS-REFERENCE TO RELATED APPLICATIONS

The present application claims priority under 35 U.S.C. § 119 to U.S. Provisional Patent Application No. 62/722,201 filed on Aug. 24, 2018, the contents of which are incorporated herein by reference in their entirety.

BACKGROUND OF THE INVENTION

Field of the Invention

The present invention relates to liquid crystal panels. More specifically, the present invention relates to a liquid crystal panel having a structure in which one pixel is divided into a plurality of alignment regions (domains).

Description of Related Art

Liquid crystal display devices utilize a liquid crystal composition to provide display. A typical display method for such devices irradiates a liquid crystal panel including a liquid crystal composition enclosed between a pair of substrates with light from the backlight and applies voltage to the liquid crystal composition to change the alignment of liquid crystal molecules, thereby controlling the amount of light passing through the liquid crystal panel. Such liquid crystal display devices have a thin profile, light weight, and low power consumption, and are therefore utilized in electronic products such as smartphones, tablet PCs, and automotive navigation systems.

Alignment division techniques have been studied which improve the viewing angle characteristics by dividing one pixel into alignment regions (domains) to align liquid crystal molecules at different azimuths in the alignment regions. JP 2015-31961 A, for example, discloses a liquid crystal display device utilizing an alignment division technique. The liquid crystal display device comprises: a display substrate which comprises a plurality of pixel areas and is curved in a first direction; an opposite substrate which faces the display substrate, is coupled to the display substrate, and is curved along the display substrate; and a liquid crystal layer disposed between the display substrate and the opposite substrate, wherein a plurality of domains are defined in each of the plurality of pixel areas, directions in which liquid crystal molecules of the liquid crystal layer are aligned are different from each other in at least two domains among the plurality of domains, and the plurality of domains is arranged in a second direction crossing the first direction.

BRIEF SUMMARY OF THE INVENTION

A liquid crystal panel, when locally pressed, suffers alignment disorder of liquid crystal molecules at the pressed portion. Especially a liquid crystal panel in which the alignment is divided tends to suffer noticeable alignment disorder because the alignment azimuths of liquid crystal molecules are discontinuous at the boundaries between domains in which the alignment azimuths of the liquid crystal molecules are different from each other. A region with alignment disorder appears as a dark region that does not transmit light and fails to provide the desired liquid crystal display. Studies made by the present inventors found that when alignment disorder of liquid crystal molecules is caused by pressing in a liquid crystal panel in which the alignment is divided, the alignment state of the liquid crystal molecules may not be restored after a lapse of time and the alignment disorder (press mark) may remain. Thus, such a liquid crystal panel can still be improved in terms of the display quality.

In response to the above issues, an object of the present invention is to provide a liquid crystal panel preventing residual alignment disorder of liquid crystal molecules due to pressing.

The present inventors made studies on the cause of residual alignment disorder of liquid crystal molecules due to pressing in a liquid crystal panel in which one pixel is divided into alignment regions (domains). The studies revealed that alignment disorder of liquid crystal molecules due to pressing tends to remain when a slit (central slit) is formed in a pixel electrode along a boundary between domains in which the alignment azimuths of liquid crystal molecules are different from each other. A central slit functions to reduce or eliminate a dark line between domains. However, the liquid crystal alignment direction provided by the alignment film in the central portion of a domain may differ from the liquid crystal alignment direction provided by the electric field formed near an end of the central slit. In such a case, after generation of alignment disorder due to pressing, liquid crystal molecules aligned in the same direction as the liquid crystal alignment direction provided by the electric field tend to remain in the alignment disorder state and not to return to the normal alignment state. The present inventors found that this alignment disorder can be eliminated by removing the electrode part disposed in the extension direction of the central slit to directly connect the central slit and slits in the domain, and thereby matching the liquid crystal alignment direction provided by the alignment film in the domain and the liquid crystal alignment direction provided by the electric field near the end of the central slit. The inventors thereby successfully achieved the above object, completing the present invention.

(1) One embodiment of the present invention relates to a liquid crystal panel sequentially including: a first substrate provided with pixel electrodes and a first alignment film; a liquid crystal layer containing liquid crystal molecules; and a second substrate provided with a common electrode and a second alignment film, the first alignment film and the second alignment film having been subjected to an alignment treatment such that pixels each include domains with different alignment vectors in a column direction, each of the alignment vectors being defined as lying from a first substrate side long-axis end of each of the liquid crystal molecules serving as a start point to a second substrate side long-axis end of the liquid crystal molecule serving as an end point, the domains being arranged in the same order in at least 30 pixels consecutive in a row direction and including a first domain, a second domain, a third domain, and a fourth domain sequentially arranged in the column direction, each of the pixel electrodes being provided with first fine slits extending parallel to the alignment vector of the second domain in the second domain, second fine slits extending parallel to the alignment vector of the third domain in the third domain, and a central slit extending along a boundary between the second domain and the third domain at the boundary, the first fine slits and the second fine slits being connected via the central slit.

(2) In an embodiment of the present invention, the liquid crystal panel includes the structure (1), and the pixel electrodes each include an electrode connecting portion connecting electrode parts between the fine slits, in an outer peripheral region on the end point side of each of the alignment vectors.

(3) In an embodiment of the present invention, the liquid crystal panel includes the structure (1) or (2), and in a plan view of the domains, the alignment vector of the first domain and the alignment vector of the second domain have a relationship in which the end points thereof face each other and the alignment vectors are perpendicular to each other, the alignment vector of the second domain and the alignment vector of the third domain have a relationship in which the start points thereof face each other and the alignment vectors are parallel to each other, and the alignment vector of the third domain and the alignment vector of the fourth domain have a relationship in which the end points thereof face each other and the alignment vectors are perpendicular to each other.

(4) In an embodiment of the present invention, the liquid crystal panel includes the structure (1), (2), or (3), and the liquid crystal molecules are aligned in a direction substantially perpendicular to the first substrate and the second substrate when no voltage is applied to the liquid crystal layer, and the liquid crystal molecules are aligned such that the liquid crystal molecules are tilted to match the alignment vector of the corresponding domain.

(5) In an embodiment of the present invention, the liquid crystal panel includes the structure (1), (2), (3), or (4), and in each of the domains, the liquid crystal molecules form a twist angle of 45° or smaller between the substrates.

The present invention can provide a liquid crystal panel preventing residual alignment disorder of liquid crystal molecules due to pressing.

BRIEF DESCRIPTION OF THE DRAWINGS

FIG. 5 is a plan view schematically showing the electrode and conductive line structure of a first substrate in the embodiment.

FIG. 6A is a plan view schematically showing the tilt azimuths of liquid crystal molecules oriented along the respective alignment vectors of adjacent two domains in the case where the difference in angle between the alignment vectors of adjacent domains is 180°.

FIG. 6B is an enlarged view specifically showing the tilt azimuths of the liquid crystal molecules in the two domains in FIG. 6A in the case where the difference in angle between the alignment vectors of adjacent domains is 180°.

FIG. 6C is a view showing some of the tilt azimuths of the liquid crystal molecules present along the arrows A and B in FIG. 6A in the case where the difference in angle between the alignment vectors of adjacent domains is 180°.

FIG. 15 is a table showing the relationship between the width (Line) of each electrode part between fine slits, the width (Space) of each fine slit, and the mode efficiency when the pixel pitch is 180 μm.

FIG. 16 is a table showing the relationship between the width (Line) of each electrode part between fine slits, the width (Space) of each fine slit, and the mode efficiency when the pixel pitch is 240 μm.

DETAILED DESCRIPTION OF THE INVENTION

An embodiment of the present invention is described below. The embodiment is not intended to limit the scope of the present invention, and the design thereof may appropriately be changed within the spirit of the present invention.

Figure 1:
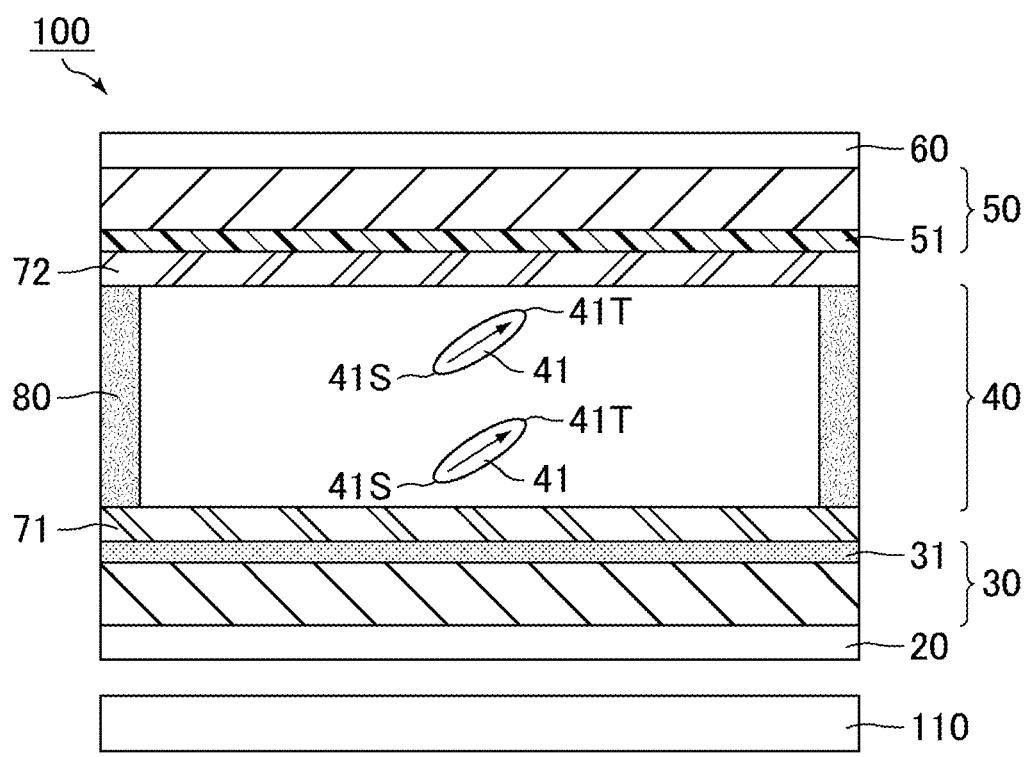
FIG. 1 is a cross-sectional view schematically showing an exemplary liquid crystal display device of an embodiment.

FIG. 1 is a cross-sectional view schematically showing an exemplary liquid crystal display device of an embodiment. As shown in FIG. 1, a liquid crystal display device of the present embodiment includes a liquid crystal panel 100 and a backlight 110 disposed on the back surface side of the liquid crystal panel 100. The liquid crystal panel 100 sequentially includes a back surface side polarizing plate 20, a first substrate 30 provided with pixel electrodes 31 and a first alignment film 71, a liquid crystal layer 40 containing liquid crystal molecules 41, a second substrate 50 provided with a second alignment film 72 and a counter electrode (common electrode) 51, and a display surface side polarizing plate 60. The liquid crystal panel 100 includes a sealant 80 around the liquid crystal layer 40.

The display mode of the liquid crystal display device of the present embodiment is described. The liquid crystal display device of the present embodiment irradiates the liquid crystal panel 100 with light from the backlight 110 and controls the amount of light transmitted through the liquid crystal panel 100 by changing the alignment of the liquid crystal molecules 41 in the liquid crystal layer 40. The alignment of the liquid crystal molecules 41 is changed by the voltage applied to the liquid crystal layer 40 by the pixel electrodes 31 and the counter electrode 51. When the voltage applied to the liquid crystal layer 40 is lower than the threshold (hereinafter, also referred to as "no-voltage applied state"), the initial alignment of the liquid crystal molecules 41 is controlled by the first alignment film 71 and the second alignment film 72.

In the no-voltage applied state, the liquid crystal molecules 41 are aligned in a direction substantially perpendicular to the first substrate 30 and the second substrate 50. The expression that the liquid crystal molecules 41 are "substantially perpendicular" means that the liquid crystal molecules 41 are aligned at a slight angle from the first substrate 30 and the second substrate 50 by the alignment treatment performed on the first alignment film 71 and the second alignment film 72. The pre-tilt angle of the liquid crystal molecules 41 relative to the first substrate 30 and the second substrate 50 in the no-voltage applied state is preferably 85° or greater and smaller than 90°. Application of voltage between the pixel electrodes 31 and the counter electrode 51 generates vertical electric fields in the liquid crystal layer 40, further significantly tilting the liquid crystal molecules 41 at the same tilt azimuth as in the no-voltage applied state.

Herein, the tilt azimuth of the liquid crystal molecules 41 is described as appropriate using an alignment vector in which in a plan view of the liquid crystal panel 100, the first substrate 30 side long-axis end of each liquid crystal molecule 41 is defined as a start point (hereinafter, also referred to as the "liquid crystal director tail") 41S and the second substrate 50 side long-axis end of the liquid crystal molecule 41 as an end point (hereinafter, also referred to as the "liquid crystal director head") 41T. The alignment vector is in the same direction as the tilt azimuth of the liquid crystal molecules 41 relative to the first alignment film 71 on the first substrate 30 side and is in the opposite direction to the tilt azimuth of the liquid crystal molecules 41 relative to the second alignment film 72 on the second substrate 50 side. The "azimuth" as used herein means the direction in a view projected onto a substrate surface without consideration of an inclination angle (polar angle, pre-tilt angle) from the direction normal to the substrate surface. The liquid crystal molecules 41 are aligned in a direction substantially perpendicular to a substrate (aligned at a slight angle) in the no-voltage applied state, and are significantly tilted at the same tilt azimuth as in the no-voltage applied state when voltage is applied. Thus, the start point 41S and the end point 41I of the alignment vector may be determined while voltage is applied to the liquid crystal layer 40.

The first alignment film 71 and the second alignment film 72 are preferably photo-alignment films formed from a photo-alignment film material and made to function to align the liquid crystal molecules 41 in a specific direction by a photo-alignment treatment. The photo-alignment film material encompasses general materials that undergo structural change when irradiated with light (electromagnetic waves) such as ultraviolet light or visible light, and thereby exhibit an ability of controlling the alignment of the nearby liquid crystal molecules 41 (alignment controlling force) or change the level and/or direction of the alignment controlling force. The photo-alignment material contains, for example, a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, cinnamoyl, 4-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include dianhydrides containing a cyclobutane ring, such as 1,2,3,4-cyclobutanetetracarboxylic-1,2:3,4-dianhydride (CBDA). The photo-alignment film material is preferably a vertically alignable one that can be used in a vertical alignment mode. Examples of the photo-alignment film material include materials containing a photo-reactive site, such as polyamides (polyamic acids), polyimides, polysiloxane derivatives, methyl methacrylate, and polyvinyl alcohols.

Figure 2:
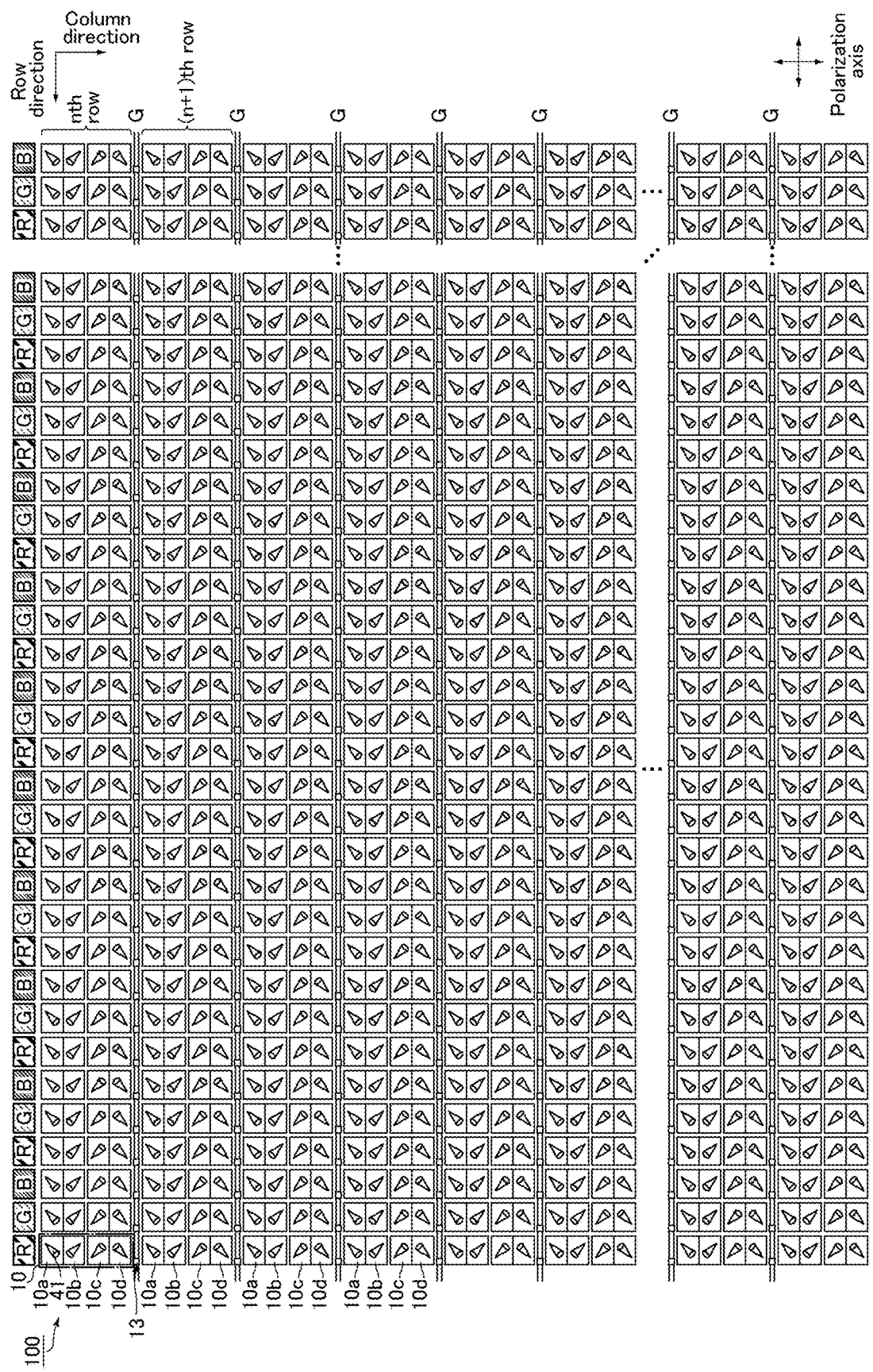
FIG. 2 is a plan view schematically showing tilt azimuths of liquid crystal molecules in a liquid crystal layer in the embodiment.

FIG. 2 is a plan view schematically showing tilt azimuths of liquid crystal molecules in a liquid crystal layer in the embodiment. As shown in FIG. 2, the liquid crystal panel 100 of the present embodiment includes pixels 10 arranged in a matrix pattern. A pixel means a display unit region superimposed with a single pixel electrode 31. The pixels include a pixel superimposed with a red (R) color filter, a pixel superimposed with a green (G) color filter, and a pixel superimposed with a blue (B) color filter. In FIG. 2, the portion surrounded by the dashed-dotted line corresponds to one pixel. The present embodiment employs the second substrate 50 in which color filters are disposed in the columns in the order of red (R), green (G), and blue (B).

In each pixel 10, domains with different alignment vectors are arranged in the column direction. These domains can be formed by performing different alignment treatments on the first alignment film 71 and the second alignment film 72. When voltage is applied to the liquid crystal layer 40, the liquid crystal molecules 41 are aligned at an angle according to the alignment vector of the corresponding domain.

Figure 3:
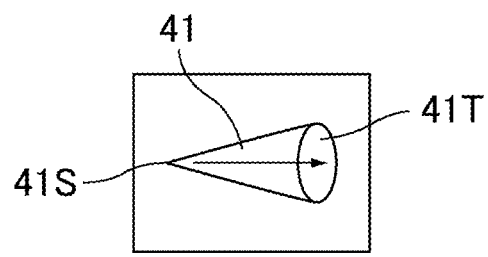
FIG. 3 is a view illustrating the relationship between the tilt azimuth and the alignment vector of a liquid crystal molecule.

FIG. 2 shows the liquid crystal molecules 41 as pins (cones) for easy understanding of the tilt azimuths of the liquid crystal molecules 41. The bottom surface of a cone indicates the second substrate 50 side (viewer's side) and the vertex of the cone indicates the first substrate 30 side. FIG. 3 is a view illustrating the relationship between the tilt azimuth and the alignment vector of a liquid crystal molecule.

As shown in FIG. 2, the domains include a first domain 10*a*, a second domain 10*b*, a third domain 10*c*, and a fourth domain 10*d* arranged in the column direction (longitudinal direction of the pixel). For favorable viewing angle characteristics, the alignment vector of the first domain 10*a*, the alignment vector of the second domain 10*b*, the alignment vector of the third domain 10*c*, and the alignment vector of the fourth domain 10*d* are defined as a combination of four alignment vectors oriented in directions different from each other by 90°.

The four alignment vectors preferably have the following relationships.

The alignment vector of the first domain 10*a* and the alignment vector of the second domain 10*b* have a relationship in which the end points of the alignment vectors face each other and the alignment vectors are perpendicular to each other (form an angle of approximately) 90° (hereinafter, this relationship is also referred to as the "domain boundary condition A").

The alignment vector of the second domain 10*b* and the alignment vector of the third domain 10*c* have a relationship in which the start points of the alignment vectors face each other and the alignment vectors are parallel to each other (form an angle of about 180°) (hereinafter, this relationship is also referred to as the "domain boundary condition B").

The alignment vector of the third domain 10*c* and the alignment vector of the fourth domain 10*d* have a relationship in which the end points of the alignment vectors face each other and the alignment vectors are perpendicular to each other (form an angle of approximately) 90° (domain boundary condition A).

The alignment vector of each domain can be determined based on the direction of a liquid crystal molecule 41 that is positioned at the center of the domain in a plan view and at the center of the liquid crystal layer in a cross-sectional view. Herein, the expression that the alignment vectors are "perpendicular to each other (form an angle of approximately 90°)" means that the alignment vectors are substantially perpendicular to each other within the range in which the effect of the present invention can be achieved; the expression specifically means that the alignment vectors form an angle of 75° to 105°, preferably an angle of 80° to 100°, more preferably an angle of 85° to 95°. Herein, the expression that the alignment vectors are "parallel to each other (form an angle of about 180°)" means that the alignment vectors are substantially parallel to each other within the range in which the effect of the present invention can be achieved; the expression specifically means that the alignment vectors form an angle of −15° to +15°, preferably an angle of −10° to +10°, more preferably an angle of −5° to +5°.

Figure 4A:
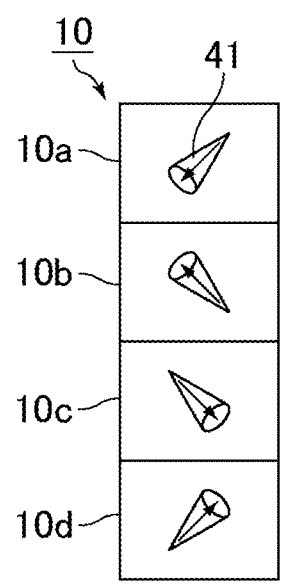
FIG. 4A is a view showing an exemplary pixel in which a first domain, a second domain, a third domain, and a fourth domain satisfy an appropriate relationship of alignment vectors.
Figure 4B:
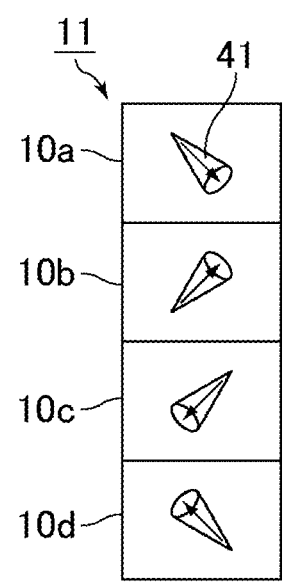
FIG. 4B is a view showing another exemplary pixel in which the first domain, the second domain, the third domain, and the fourth domain satisfy an appropriate relationship of alignment vectors.

FIGS. 4A and 4B are views each showing an exemplary pixel in which a first domain, a second domain, a third domain, and a fourth domain satisfy an appropriate relationship of alignment vectors. Examples of the pixel satisfying an appropriate relationship of the alignment vectors include a pixel 10 (same as in FIG. 2) shown in FIG. 4A and a pixel 11 shown in FIG. 4B.

In each of the first domain 10a, the second domain 10b, the third domain 10c, and the fourth domain 10d, the liquid crystal molecules 41 preferably form a twist angle of 45° or smaller, more preferably an angle of approximately 0°, between the substrates. In other words, in each of the first domain 10a, the second domain 10b, the third domain 10c, and the fourth domain 10d, the angle formed by the tilt azimuth of the liquid crystal molecules 41 relative to the first alignment film 71 on the first substrate 30 side and the tilt azimuth of the liquid crystal molecules 41 relative to the second alignment film 72 on the second substrate 50 side is preferably 45° or smaller, more preferably approximately 0°.

The liquid crystal panel 100 of the present embodiment has excellent viewing angle characteristics owing to the pixels each including domains. In the pixels each including domains, a region with the liquid crystal molecules 41 discontinuously aligned may be generated at a boundary between adjacent domains. In such a region, the liquid crystal molecules 41 cannot be aligned in the desired direction, so that light cannot be sufficiently transmitted in the display state. The region is therefore perceived as a dark portion. A linearly formed dark portion is called a dark line. Generation of a dark line decreases the luminance of the pixel, decreasing the light use efficiency of the liquid crystal panel.

As shown in FIG. 2, at least 30 pixels consecutive in the row direction in the liquid crystal panel 100 of the present embodiment each include the first domain 10a, the second domain 10b, the third domain 10c, and the fourth domain 10d in the same order (the same domain arrangement). The proportion of the pixels having the same domain arrangement consecutive in the row direction is preferably ½ or more, more preferably 90% or more, of the whole pixels arranged in the row direction of the display region. Still more preferably, pixels arranged in the row direction throughout the display region have the same domain arrangement. Pixels arranged in the row direction can be provided with the same domain arrangement by performing an alignment treatment by scanning exposure on the first alignment film 71 and the second alignment film 72.

The same domain arrangement in pixels arranged consecutively in the row direction can reduce or eliminate generation of defects due to fitting failure of the liquid crystal panel 100 in the row direction. Specifically, this structure can reduce or eliminate generation of display defects such as display unevenness due to deflection of the liquid crystal panel 100, and the effect thereof is significant in a high value-added, large, high-definition liquid crystal panel. The liquid crystal panel 100 of the present embodiment is suitable for a high value-added, large, high-definition liquid crystal display required to have excellent display quality. The liquid crystal panel 100 can also be used for a good designed, large, high-definition curved (non-planar) display. Another possible method for reducing or eliminating the display unevenness is to thicken a light-shielding member; however, this method decreases the transmittance. Since high-definition liquid crystal panels have an especially low transmittance, the further decrease in transmittance causes a major problem such as a loss of merchantability.

Liquid crystal panels are likely to be produced as large, light weight (with a thin glass substrate), high-definition panels. Such large, light weight liquid crystal panels tend to be deflected, especially in the long-side direction (row direction). When a liquid crystal panel is deflected, fitting failure of the first substrate and the second substrate occurs partially and irregularly. In a conventional liquid crystal panel having a multi-domain structure, fitting failure changes the widths and shapes of dark lines at domain boundaries to change the transmittance, causing display unevenness. The display unevenness is belt-shaped unevenness extending from the upper end to the lower end of the liquid crystal panel and may be generated at irregular positions and significantly deteriorate the display quality of the entire liquid crystal panel. The display unevenness tends to be generated in a comparatively expensive, large, high-definition liquid crystal panel. Still, the liquid crystal panel 100 of the present embodiment, although having a multi-domain structure, causes no change in width and shape of the dark lines due to fitting failure in the row direction. This is because the liquid crystal panel 100 of the present embodiment has the same domain arrangement in the row direction, and thus no domain boundary or dark line is present in the row direction. This structure is an essential measure to take against the display unevenness.

The structure of the liquid crystal display device of the present embodiment is summarized below. The first substrate 30 may be, for example, an active matrix substrate (TFT substrate). The TFT substrate can be one usually used in the field of liquid crystal panels. FIG. 5 is a plan view schematically showing the electrode and conductive line structure of a first substrate in the embodiment. In a plan view, the TFT substrate may have, for example, a structure including, on a transparent substrate, parallel gate signal lines G; parallel source signal lines S extending in the direction perpendicular to the gate signal lines G; active elements such as TFTs 13 disposed at the intersections of the gate signal lines G and the source signal lines S; and pixel electrodes 31 disposed in a matrix pattern in the regions partitioned by the gate signal lines G and the source signal lines S. Capacitance lines CS may be disposed parallel to the gate signal lines G.

The TFTs 13 are preferably ones including channels formed from an oxide semiconductor. The oxide semiconductor can be, for example, a compound (In—Ga—Zn—O) composed of indium (In), gallium (Ga), zinc (Zn), and oxygen (O), a compound (In-Tin-Zn—O) composed of indium (In), tin (Tin), zinc (Zn), and oxygen (O), or a compound (In—Al—Zn—O) composed of indium (In), aluminum (Al), zinc (Zn), and oxygen (O).

A single pixel electrode 31 shown in FIG. 5 is superimposed with the corresponding first domain 10a, second domain 10b, third domain 10c, and fourth domain 10d. Thus, when voltage is applied to the liquid crystal layer 40, the same magnitude of an electric field is generated in the thickness direction of the liquid crystal layer 40 in the first domain 10a, the second domain 10b, the third domain 10c, and the fourth domain 10d.

Each pixel electrode 31 is provided with slits. The slits include fine slits 36 extending parallel to the alignment vector of the corresponding domain and a central slit 33 extending along the boundary between domains. In the second domain 10b are provided first fine slits 36 extending parallel to the alignment vector of the second domain 10b. In the third domain 10c are provided second fine slits 36 extending parallel to the alignment vector of the third domain 10c. At the boundary between the second domain 10b and the third domain 10c is provided the central slit 33 extending along the boundary. The first fine slits 36 and the second fine slits 36 are connected to each other via the central slit 33. In the first domain 10a, fine slits 36 a extending parallel to the alignment vector of the first domain 10a may be provided. In the fourth domain 10d, fine slits 36 d extending parallel to the alignment vector of the fourth domain 10d may be provided.

The fine slits 36 are preferably slits between electrode parts extending parallel to the desired alignment direction (alignment vector) of liquid crystal molecules. When voltage is applied to the pixel electrodes 31, the fine slits 36 generate a groove-shaped potential parallel to the fine slits 36 and form horizontal electric fields that are parallel to the substrate surfaces and perpendicular to the fine slits 36. The horizontal electric fields change the alignment direction of the liquid crystal molecules 41 to align the liquid crystal molecules 41 in the direction parallel to the fine slits 36. The change in electric field caused by the fine slits 36 is referred to as "electric field distortion".

Each fine slits 36 may have a width narrower than, substantially equal to, or wider than the central slit 33.

The fine slits 36 are suited to eliminate dark lines generated around a pixel (in the vicinity of electrode ends). A dark line around a pixel is generated at a position where the head of a liquid crystal director faces an electrode end (electrode edge). At such a position, the alignment direction of the liquid crystal molecules 41 set by the electric field distortion at the electrode end and the alignment direction provided by the alignment treatment in the domain are different by approximately 135°. When these alignments are continuously connected, the absorption axes of the back surface side polarizing plate 20 and the display surface side polarizing plate 60 perpendicular to each other become parallel (or perpendicular) to the major axes of the liquid crystal molecules 41 in some portions, and the portions are perceived as dark lines. The fine slits 36 provided at least at the ends of the pixel electrodes 31 can reduce or eliminate misalignment of the liquid crystal molecules 41 at the ends of the pixel electrodes 31 and align the liquid crystal molecules 41 in the desired direction even at the electric field ends, so that generation of dark lines can be reduced or eliminated.

The central slit 33 is suited to eliminate a double dark line. In the liquid crystal panel 100 of the present embodiment, the difference in angle between the alignment vectors of adjacent domains is 90° at two domain boundaries among the three domain boundaries in one pixel. Here, the difference in angle between the alignment vectors of adjacent domains is 180° at the boundary between the second domain 10b and the third domain 10c. Thus, the rotation angle of the liquid crystal directors is 180° at the boundary between the second domain 10b and the third domain 10c.

FIGS. 6A to 6C are each views in the case where the difference in angle between the alignment vectors of adjacent domains is 180°. FIG. 6A is a plan view schematically showing the tilt azimuths of liquid crystal molecules oriented along the respective alignment vectors of adjacent two domains. FIG. 6B is an enlarged view specifically showing the tilt azimuths of the liquid crystal molecules in the two domains in FIG. 6A. FIG. 6C is a view showing some of the tilt azimuths of the liquid crystal molecules present along the arrows A and B in FIG. 6A. In FIGS. 6B and 6C, liquid crystal molecules appearing as dark portions in the display state are colored. In the case where the tilt azimuth of the liquid crystal molecules is parallel to the absorption axis of the back surface side polarizing plate 20 or the absorption axis of the display surface side polarizing plate 60, which are perpendicular to each other, the liquid crystal molecules 41 are perceived as dark portions. As shown in FIGS. 6B and 6C, two dark lines extending parallel to the boundary are generated near the boundary. These two dark lines form a line called a double dark line.

When a double dark line is generated, the light use efficiency decreases. Hence, the display luminance decreases at the same luminance of light from the backlight, meaning that further increasing the luminance of light from the backlight in order to maintain the display luminance results in higher power consumption. Also in the strict sense, the double dark line is not composed of separate two dark lines and is an X-shaped dark line crushed down along the boundary between adjacent domains. The position of the central point (crossing point) of the X shape is inconstant, so that the position and size of the dark line tend to differ in different pixels. The double dark lines therefore cause the optical characteristics of the pixels uneven, and thereby decrease the uniformity of display throughout the screen of the panel. Double dark lines are generated irregularly because the alignment at a boundary of adjacent domains depends on the alignment relationship between adjacent domains, for example. Such irregular generation of double dark lines can be prevented using a structure for positioning (fixing) the central point (crossing point) of the X shape. Thus, use of the central slit 33 enables stabilization of the shape of dark lines.

In other words, in the liquid crystal panel 100 of the present embodiment, the central slit 33 provided at the boundary between the second domain 10b and the third domain 10c in each pixel electrode 31 leads to electric field distortion due to the central slit 33 near the boundary between the second domain 10b and the third domain 10c. This can deliberately keep the continuous alignment change at the boundary between the second domain 10b and the third domain 10c to 90° or smaller, thereby substantially eliminating double dark lines.

Figure 7:
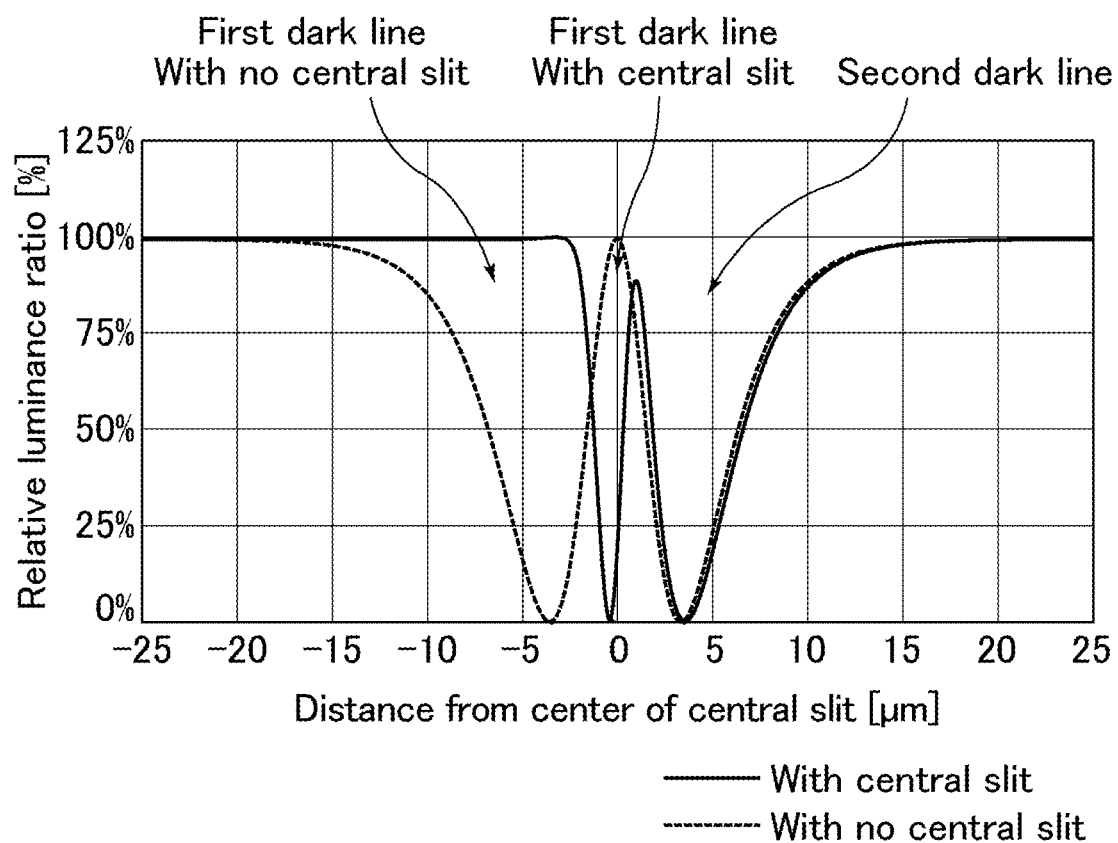
FIG. 7 is a graph comparing the simulation results of the transmittance in a domain boundary region with no central slit and the transmittance in a domain boundary region with a central slit having a width of 4 μm.

Herein, "substantially eliminating double dark lines" means that double dark lines are not clearly perceived, and encompasses not only the cases where a double dark line is eliminated but also the cases where one of the two dark lines constituting a double line is difficult to perceive and the other dark line is perceivable, such as the state where a double dark line is completely eliminated and the state where one of the two dark lines constituting a double dark line disappeared and the other dark line is perceivable. A narrow central slit 33 (central slit 33 with a small slit width) may not eliminate dark lines constituting a double dark line, but still narrows down at least one of the two dark lines, thereby achieving a higher transmittance than a structure with no central slit 33 in the domain boundary region. Thus, such a narrow central slit 33 can be evaluated as substantially eliminating a double dark line. FIG. 7 is a graph comparing the simulation results of the transmittance in a domain boundary region with no central slit 33 and the transmittance in a domain boundary region with a central slit 33 having a width of 4 μm. The horizontal axis in FIG. 7 shows the distance from the center of the central slit 33. The vertical axis in FIG. 7 shows the relative luminance ratio based on the transmittance in the central portion of the pixel taken as 100%. As shown in FIG. 7, with the central slit 33, two dark lines are generated, but the first dark line to the left in FIG. 7 shows a significantly small width and the transmittance near–3 μm from the center of the central slit 33 is significantly high. In contrast, with a thick central slit 33 (central slit 33 with a large slit width), the double dark line can be eliminated, but the remaining one dark line has a large width; thus, in the domain boundary region, the transmittance may be lower than the case with no central slit 33. In other words, there is an optimal value for the width of the central slit 33. In the domain arrangement in the present embodiment, the width of the central slit 33 provided at the boundary between the second domain 10b and the third domain 10c is preferably 1 to 8 μm, more preferably 2.5 to 6 μm.

In the liquid crystal panel 100 of the present embodiment, the first fine slits 36 and the second fine slits 36 are connected via the central slit 33. In the case where the central slit 33 is not connected to the first fine slits 36 and the second fine slits 36 c, an electrode part extending in the extension direction of the central slit 33 is provided between the central slit 33 and the first fine slits 36 and between the central slit 33 and the second fine slits 36 c. In this case, the liquid crystal alignment direction provided by the electric field generated near an end of the central slit 33 does not match the liquid crystal alignment direction provided by the alignment film in a domain. Thus, once alignment disorder is generated by pressing, the liquid crystal molecules 41 aligned in the same direction as the liquid crystal alignment direction provided by the electric field stay in the alignment disorder state and do not return to the normal alignment state. Thereby, a phenomenon occurs in which dark lines due to pressing remain near the central slit 33. In contrast, in the liquid crystal panel 100 of the present embodiment, the first fine slits 36 and the second fine slits 36 are connected via the central slit 33, so that the liquid crystal panel 100 can prevent residual alignment disorder (press mark) of the liquid crystal molecules 41 due to pressing.

Figure 8A:
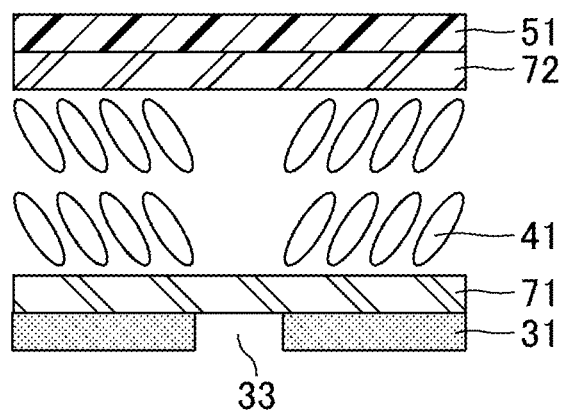
FIG. 8A is a view illustrating the generation mechanism of a press mark, showing liquid crystal molecules in the normal state.
Figure 8B:
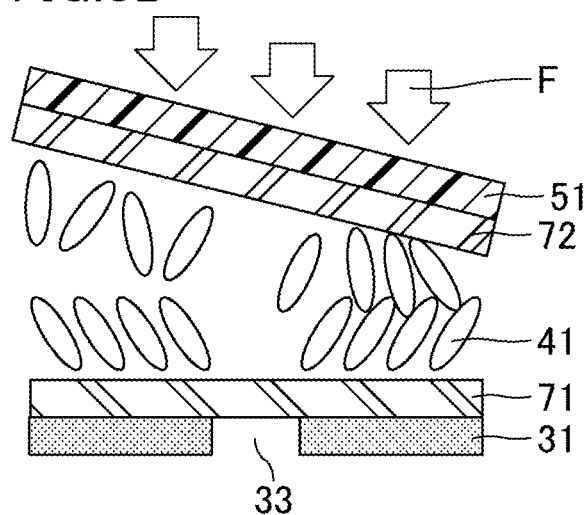
FIG. 8B is a view illustrating the generation mechanism of a press mark, showing liquid crystal molecules during pressing.

The following describes the generation mechanism of a press mark and the elimination mechanism of the press mark in the present invention. FIGS. 8A and 8B are views illustrating the generation mechanism of a press mark. FIG. 8A shows liquid crystal molecules in the normal state. FIG. 8B shows liquid crystal molecules during pressing. As shown in FIG. 8A, the liquid crystal molecules 41 in the normal state are aligned in the alignment direction at the interface of the substrates. As shown in FIG. 8B, when the force F is applied to the liquid crystal panel 100 and thereby the substrate is distorted, the alignment of the liquid crystal molecules 41 is disturbed and a press mark is generated. Such a press mark tends to be generated at boundaries between alignment domains and the ends of electrode slits.

Figure 9A:
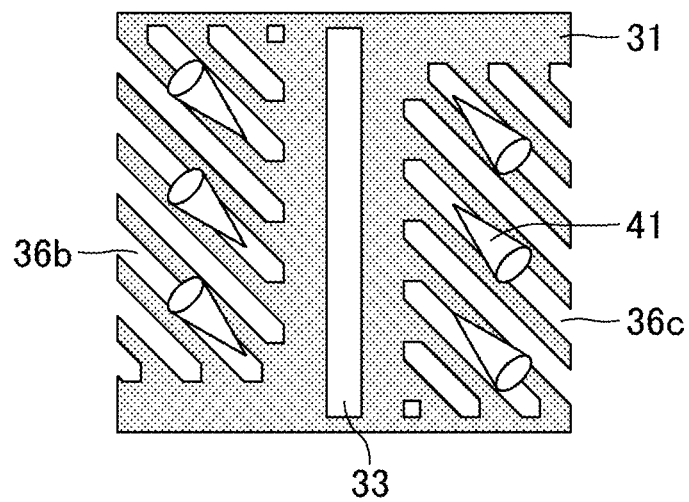
FIG. 9A is a plan view schematically showing a pixel electrode in a comparative embodiment.
Figure 9B:
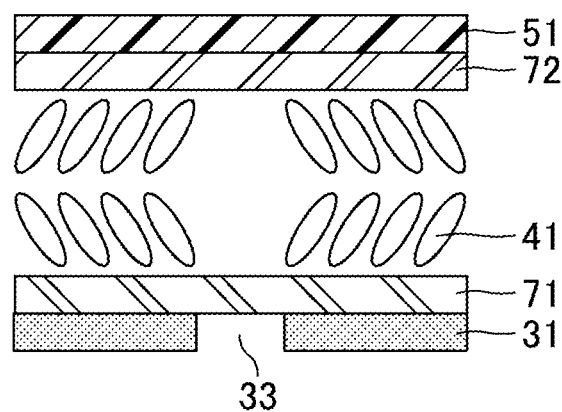
FIG. 9B is a cross-sectional view schematically showing the state where voltage is applied to the liquid crystal layer by a pixel electrode in the comparative embodiment after pressing.
Figure 9C:
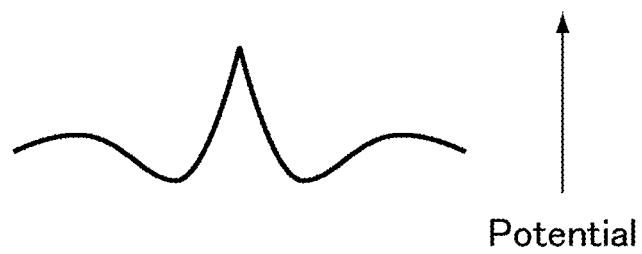
FIG. 9C is a view showing the shape of an equipotential surface formed in the liquid crystal layer by the pixel electrode in the comparative embodiment as viewed from the cross-sectional direction of the liquid crystal layer.

FIG. 9A is a plan view schematically showing a pixel electrode in a comparative embodiment. FIG. 9B is a cross-sectional view schematically showing the state where voltage is applied to the liquid crystal layer by a pixel electrode in the comparative embodiment after pressing. FIG. 9C is a view showing the shape of an equipotential surface formed in the liquid crystal layer by the pixel electrode in the comparative embodiment as viewed from the cross-sectional direction of the liquid crystal layer. As shown in FIG. 9A, when the central slit 33 is not connected to the first fine slits 36 and the second fine slits 36 c, the alignment of the liquid crystal molecules 41 is changed from the state shown in FIG. 8B to the state shown in FIG. 9B. This is because with an electrode connecting portion between the first fine slits 36 and the central slit 33 and between the second fine slits 36 and the central slit 33, the equipotential surface of the electric fields generated by the pixel electrode 31 has the pattern shown in FIG. 9C. The state shown in FIG. 9B is different from the normal state shown in FIG. 8A in that the alignment direction at the interface between the substrates and the alignment direction provided by the electric fields do not match each other at the electrode connecting portion, so that the press mark remains.

Figure 10A:
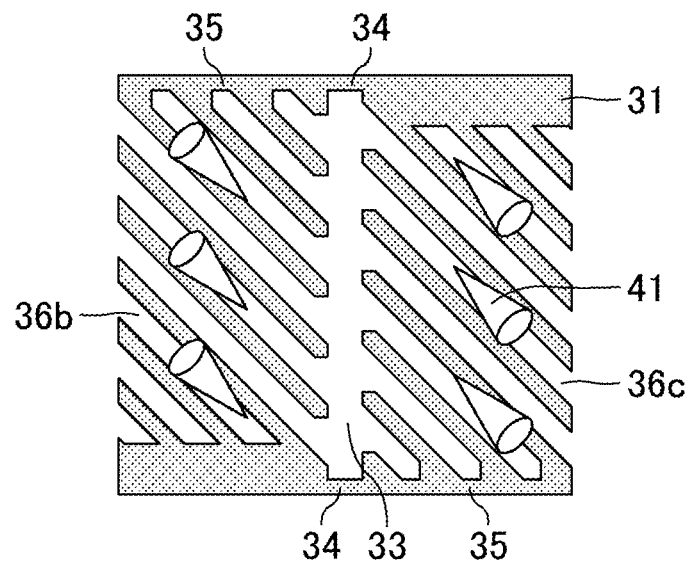
FIG. 10A is a plan view schematically showing a pixel electrode in the embodiment.
Figure 10B:
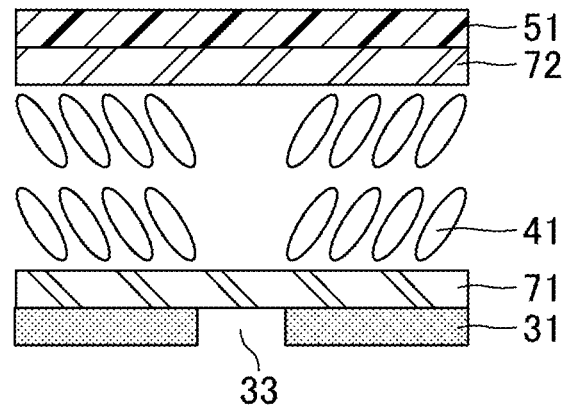
FIG. 10B is a cross-sectional view schematically showing the state where voltage is applied to the liquid crystal layer by a pixel electrode in the embodiment after pressing.
Figure 10C:
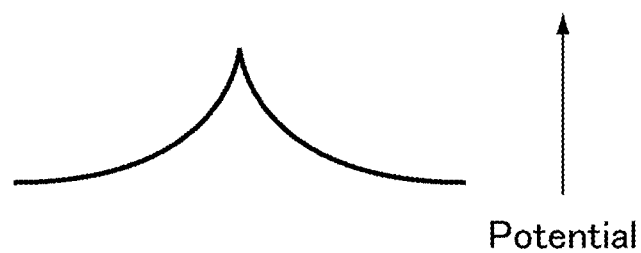
FIG. 10C is a view showing the shape of an equipotential surface formed in the liquid crystal layer by the pixel electrode in the embodiment as viewed from the cross-sectional direction of the liquid crystal layer.

FIG. 10A is a plan view schematically showing a pixel electrode in the embodiment. FIG. 10B is a cross-sectional view schematically showing the state where voltage is applied to the liquid crystal layer by a pixel electrode in the embodiment after pressing. FIG. 10C is a view showing the shape of an equipotential surface formed in the liquid crystal layer by the pixel electrode in the embodiment as viewed from the cross-sectional direction of the liquid crystal layer. As shown in FIG. 10A, when the central slit 33 is connected to the first fine slits 36 and the second fine slits 36 c, the alignment of the liquid crystal molecules 41 is changed from the state shown in FIG. 8B to the state shown in FIG. 10B. This is because with no electrode connecting portion between the first fine slits 36 b and the central slit 33 and between the second fine slits 36 and the central slit 33, the equipotential surface of the electric fields generated by the pixel electrode 31 monotonically changes toward the center of the slits, and thereby has the pattern shown in FIG. 10C. The pattern in FIG. 10C shows that the alignment direction at the interface between the substrates and the alignment direction provided by the electric fields match each other, so that the press mark can be easily eliminated.

At each end in the longitudinal direction of the central slit 33 is preferably formed a connector (electrode connecting portion) 34. The connector 34 can prevent separation of the pixel electrode 31 into two and enables collective voltage application to the pixel electrode 31. Also, the connector 34 provided at each end of the central slit 33 can prevent generation of different electric fields at the ends of the central slit 33, enhancing the uniformity of display.

The pixel electrodes 31 each preferably include an electrode connecting portion 35 connecting electrode parts between the fine slits, in an outer peripheral region on the end point side of each of the alignment vectors. With the electrode connecting portion 35 in the outer peripheral region on the end point side of each of the alignment vectors, residual alignment disorder of the liquid crystal molecules 41 due to pressing can be more effectively prevented.

The second substrate 50 includes the counter electrode 51, and may be, for example, a color filter substrate (CF substrate). The color filter substrate can be one commonly used in the field of liquid crystal display panels.

The color filter substrate may have a structure including, on a transparent substrate, components such as a black matrix formed in a grid pattern and color filters formed inside the cells of the grid, i.e., pixels. The black matrix may include a portion superimposed on the boundary of each pixel such that a cell of the grid is formed for the pixel, and may also include a portion crossing the center of each pixel in the short-side direction such that a cell of the grid is formed for each half pixel. A black matrix formed to be superimposed on dark line regions can reduce the chances of dark line observation.

The counter electrode 51 is arranged to face the pixel electrodes 31 across the liquid crystal layer 40. Vertical electric fields are generated between the counter electrode 51 and the pixel electrodes 31, so that the liquid crystal molecules are tilted to provide display. Color filters may be arranged in the order of red (R), green (G), and blue (B), in the order of yellow (Y), red (R), green (G), and blue (B), or in the order of red (R), green (G), blue (B), and green (G) in each column, for example.

The counter electrode 51 is preferably a planar electrode. The counter electrode 51 may be a transparent electrode, and can be formed from, for example, a transparent conductive material such as indium tin oxide (ITO), indium zinc oxide (IZO), zinc oxide (ZnO), or tin oxide (SnO), or an alloy thereof.

The liquid crystal panel 100 of the present embodiment includes the first substrate 30 and the second substrate 50 bonded to each other with the sealant 80 surrounding the liquid crystal layer 40, and the liquid crystal layer 40 is held in the predetermined region. The sealant 80 can be, for example, an epoxy resin containing an inorganic or organic filler and a curing agent.

The present embodiment may employ the polymer sustained alignment (PSA) technique. The PSA technique seals a liquid crystal composition containing a photo-polymerizable monomer between the first substrate 30 and the second substrate 50 and then irradiates the liquid crystal layer 40 with light to polymerize the photo-polymerizable monomer, thereby forming a polymer on the surfaces of the first alignment film 71 and the second alignment film 72 and utilizing the polymer to fix the initial tilt (pre-tilt) of the liquid crystal molecules.

The polarization axis of the back surface side polarizing plate 20 and the polarization axis of the display surface side polarizing plate 60 may be perpendicular to each other. Here, the polarization axis may be the absorption axis or the transmission axis of a polarizing plate. Typical examples of the back surface side polarizing plate 20 and the display surface side polarizing plate 60 include those obtained by adsorbing a dichroic anisotropic material such as an iodine complex on a polyvinyl alcohol (PVA) film and aligning the material. Typically, each surface of a PVA film is laminated with a protective film such as a triacetyl cellulose film for practical use. An optical film such as a retardation film may be arranged between the back surface side polarizing plate 20 and the first substrate 30 or between the display surface side polarizing plate 60 and the second substrate 50.

The backlight 110 may be any backlight that emits light including only visible light or light including both visible light and ultraviolet light. In order to provide color display on the liquid crystal display device, a backlight emitting white light is suitable. Suitable kinds of the backlight include light emitting diodes (LEDs). The "visible light" as used herein means light (electromagnetic waves) having a wavelength of 380 nm or longer and shorter than 800 nm.

The liquid crystal display device of the present embodiment has a structure including, as well as the liquid crystal display panel 100 and the backlight 110, components including external circuits such as a tape-carrier package (TCP) and a printed circuit board (PCB); optical films such as a viewing angle-increasing film and a luminance-increasing film; and a bezel (frame). Some components may be incorporated into another component. Components other than those described above are not particularly limited and are not described here because such components can be those commonly used in the field of liquid crystal display devices.

The method for producing the liquid crystal panel 100 of the present embodiment is not particularly limited, and may be a method usually used in the field of liquid crystal panels. For example, the alignment treatment for the first alignment film 71 and the second alignment film 72 is performed by a photo-alignment treatment irradiating the target with light (electromagnetic waves) such as ultraviolet light or visible light. The photo-alignment treatment can be performed with, for example, a device having a light source for irradiating the first alignment film 71 and the second alignment film 72 with light and a function to conduct continuous scanning exposure for the pixels. Specific modes of the scanning exposure include a mode of irradiating a substrate surface with light from a light source while moving the substrate; a mode of irradiating a substrate surface with light from a light source while moving the light source; and a mode of irradiating a substrate surface with light from a light source while moving the light source and the substrate.

An evaluation test performed on the liquid crystal panel 100 of the present embodiment is described.

(A) Relationship between Alignment Vectors and Dark Lines in Adjacent Domains

The relationship between the alignment vectors of domains and dark lines generated between adjacent domains or at pixel ends was evaluated by the following method.

(Measurement Procedure)

1. Polarizers were disposed in crossed Nicols. A micrograph of pixels was taken with 7 V of square wave voltage having a frequency of 30 Hz applied to an evaluation cell (liquid crystal panel), under the photographing conditions of objective lens: 10× magnification, ISO speed: ISO 200, and shutter speed: ¼ seconds.

2. The micrograph was converted by gamma correction such that the grayscale and the luminance have a proportion relationship.

3. The luminance profile in the pixel major axis direction (direction perpendicular to the dark line) was obtained from the pixel micrograph, and the profile of the dark line portion was extracted to calculate the total luminance.

4. The luminances of various dark lines were evaluated, and the relative luminance ratio was calculated based on the luminance of a dark line under the domain boundary condition A taken as 1.

(Evaluation Conditions)

The condition that the end points of alignment vectors of adjacent domains face each other and the alignment vectors form an angle of 90° (domain boundary condition A)

The condition that the start points of alignment vectors of adjacent domains face each other and the alignment vectors form an angle of 180° (domain boundary condition B)

The condition that the end points of alignment vectors of adjacent domains face each other and the alignment vectors form an angle of 180° (domain boundary condition C)

The condition that the start points of alignment vectors of adjacent domains face each other and the alignment vectors form an angle of 90° (domain boundary condition D)

The condition that the start point of an alignment vector and the end point of an alignment vector of adjacent domains face each other and the alignment vectors form an angle of 90° (domain boundary condition E)

The condition that the end point of the alignment vector of a domain faces the pixel edge (domain boundary condition F)

The condition that the start point of the alignment vector of a domain faces the pixel edge (domain boundary condition G)

The evaluation results are shown in the following Table 1. The results obtained by the image processing substantially matched the results obtained by the simulation. Thus, the following description is based on the results obtained by the simulation. The dark lines under the domain boundary conditions A and D were found to be brightest and effective in increasing the transmittance. The dark line luminance at a pixel edge under the condition that the end point of the alignment vector of a domain faces the pixel edge (domain boundary condition E) was equivalent to the luminance under the domain boundary condition A. The dark line luminance at a pixel edge under the condition that the start point of the alignment vector of a domain faces the pixel edge (domain boundary condition F) was 1.08 times the luminance under the domain boundary condition A.

TABLE 1

| Domain boundary condition | Measured value | Simulated value |
|---|---|---|
| A | 1 | 1 |
| B | 0.93 | 0.90 |
| C | 0.95 | 0.90 |
| D | — | 1.00 |
| E | — | 1.01 |
| F | 1.01 | 1.02 |
| G | 1.06 | 1.08 |

(B) Central Slit 33 between Adjacent Domains

The simulation revealed that there is the optimal width for the width of the central slit 33 in terms of mode efficiency increase. In the domain arrangement in the present embodiment, the width of the central slit 33 at the boundary between the second domain 10b and the third domain 10c (domain boundary condition B) is preferably 1 to 8 μm, more preferably 2.5 to 6 μm.

Figure 11:
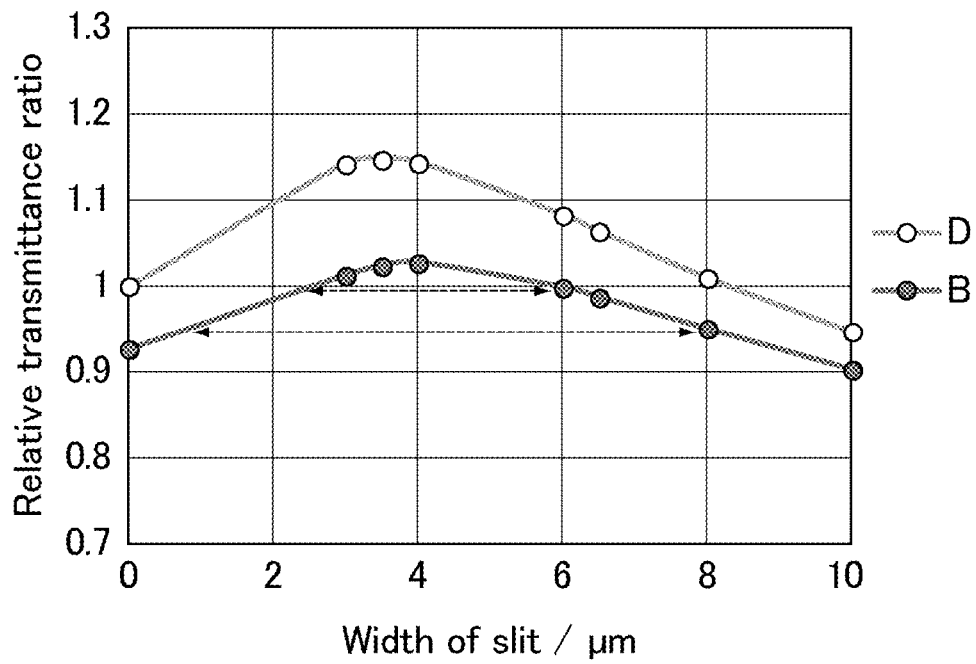
FIG. 11 is a graph showing the relationship between the width of a slit and the transmittance (relative transmittance ratio) of a dark line portion under domain boundary conditions B and D.
Figure 12:
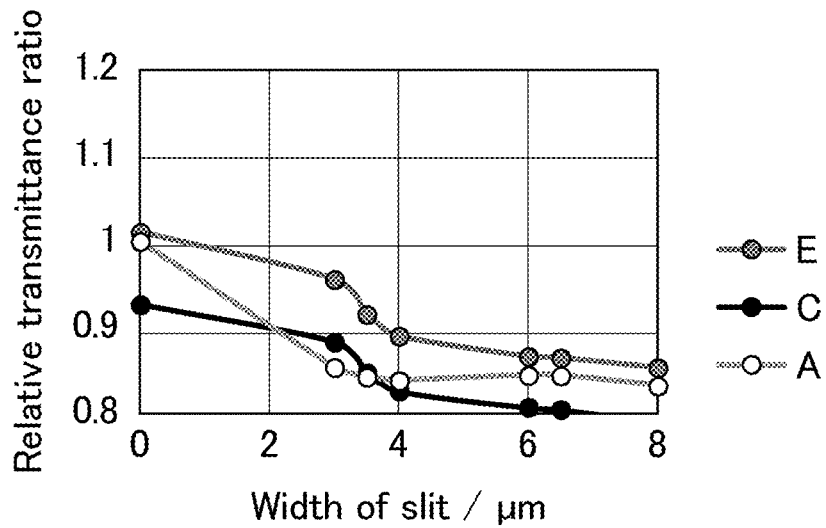
FIG. 12 is a graph showing the relationship between the width of a slit and the transmittance (relative transmittance ratio) of a dark line portion under domain boundary conditions A, C, and E.

FIG. 11 is a graph showing the relationship between the width of a slit and the transmittance (relative transmittance ratio) of a dark line portion under the domain boundary conditions B and D. FIG. 12 is a graph showing the relationship between the width of a slit and the transmittance (relative transmittance ratio) of a dark line portion under the domain boundary conditions A, C, and E. The relative transmittance ratio shown by the vertical axis of the graph in each of FIGS. 11 and 12 is obtained by normalizing the transmittance of the dark line portion under the target domain boundary condition with the transmittance of the dark line portion under the domain boundary condition A without slits taken as 1. FIG. 11 shows that under the domain boundary condition B, slits having a width of 1 to 8 μm resulted in a high relative transmittance ratio; slits having a width of 2.5 to 6 μm increased the transmittance of the dark line portion to be equal to or higher than that under the domain boundary condition A with no slits; and slits having a width of 4 μm achieved the highest relative transmittance ratio. FIG. 11 also shows that under the domain boundary condition D, slits having a width falling within the range of 0 μm<slit width≤8 μm increased the transmittance; and slits having a width of 3.5 μm achieved the highest relative transmittance ratio. In contrast, as shown in FIG. 12, the central slit 33 decreased the transmittance of the dark line under the domain boundary conditions A, C, and E.

(C) Alignment Pattern and Optimal Structure of Slits

Figure 13A:
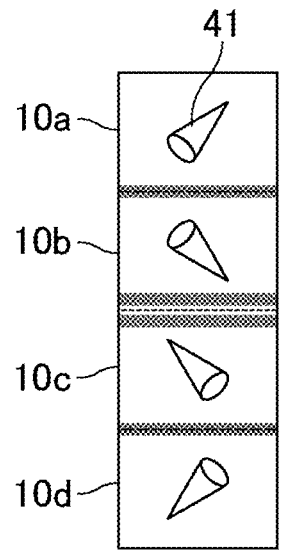
FIG. 13A is a plan view schematically showing the relationship between an alignment pattern and a dark line pattern.
Figure 13B:
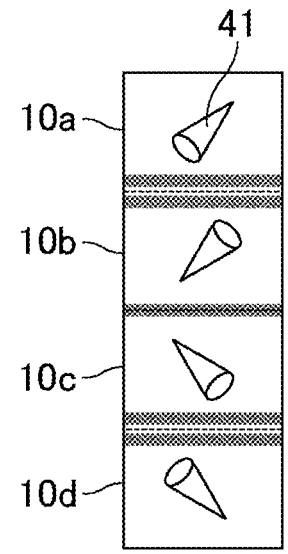
FIG. 13B is a plan view schematically showing the relationship between an alignment pattern and a dark line pattern.

In the present embodiment, the first domain 10a, the second domain 10b, the third domain 10c, and the fourth domain 10d were sequentially arranged in the longitudinal direction of the pixels to achieve the domain boundary condition A-B-A. This is because the relationship between the alignment pattern and the dark line pattern shown in FIGS. 13A and 13B and the optimization of the slit width of the pixel electrodes 31 overlapping with the dark lines can achieve the highest mode efficiency and increase the display quality as a result of double dark line elimination.

For example, the average luminance of the dark lines is calculated using the simulation results shown in Table 1 when the central slit 33 having a width of 4 μm is formed at the boundary between the second domain 10b and the third domain 10c (domain boundary condition B) in a pixel having a domain arrangement under the boundary condition A-B-A. The calculation results in 1.04 as shown by the following formula (A).

$$(1.00\times2+1.04+1.08\times2)/5=1.04 \tag{A}$$

Meanwhile, the average luminance of the dark lines calculated using the simulation results shown in Table 1 in a pixel having a domain arrangement under the boundary condition C-D-C is 0.99 as shown by the following formula (B).

$$(0.90\times2+1.00+1.08\times2)/5=0.99 \tag{B}$$

As described above, in a pixel having a domain arrangement under the boundary condition A-B-A, the central slit 33 formed at the boundary between the second domain 10b and the third domain 10c (domain boundary condition B) can substantially eliminate the double dark line, increasing the mode efficiency. The luminance reaches the maximum when thin dark lines are formed in a region under the domain boundary condition A and slits are provided so as to overlap the dark lines in a region under the domain boundary condition B.

(D) Fine Slit 36 Conditions

Figure 14:
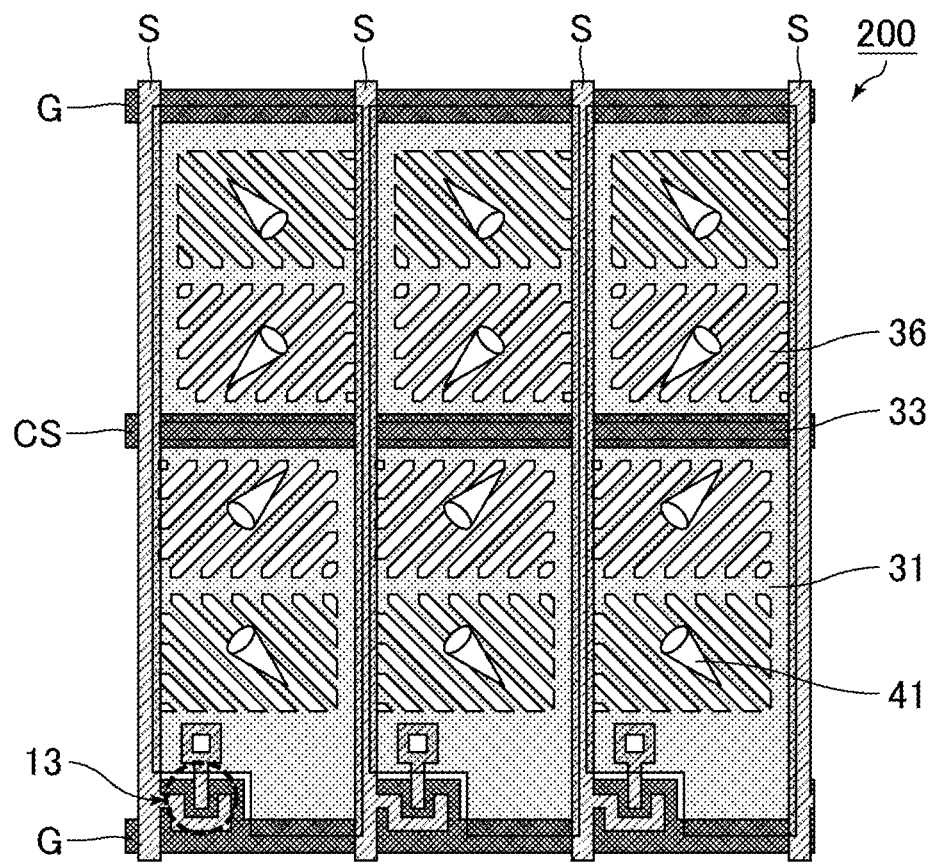
FIG. 14 is a plan view schematically showing the electrode and conductive line structure of a first substrate in the comparative embodiment.

In order to find the optimal combination of the width L (Line) of each electrode part between the fine slits 36 and the width S (Space) of each fine slit 36, the mode efficiencies were measured using various L and S conditions of a pixel electrode 31 provided with the fine slits 36 having the shape and arrangement pattern as shown in FIG. 14. The evaluation results are shown in FIGS. 15 and 16. FIG. 15 is a table showing the relationship between the width (Line) of each electrode part between the fine slits 36, the width (Space) of each fine slit 36, and the mode efficiency when the pixel pitch is 180 μm. FIG. 16 is a table showing the relationship between the width (Line) of each electrode part between the fine slits 36, the width (Space) of each fine slit 36, and the mode efficiency when the pixel pitch is 240 μm. The mode efficiency in the present evaluation item is a value obtained by normalizing the mode efficiency based on the mode efficiency with Line/Space=2.1 μm/3.1 μm taken as 1.

Figure 17:
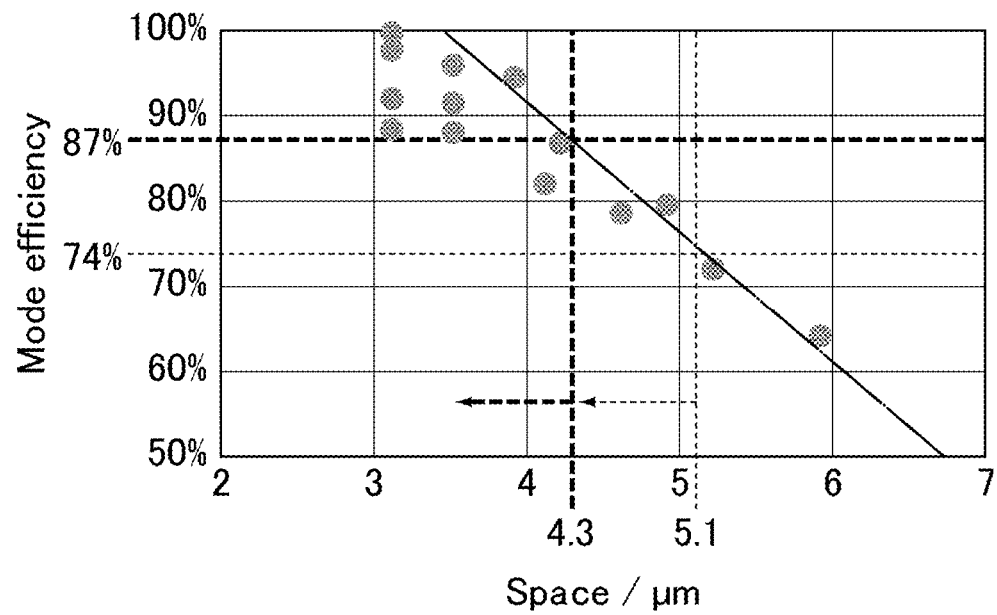
FIG. 17 is a graph showing the relationship between the width (Space) of each fine slit and the mode efficiency when the pixel pitch is 180 μm.
Figure 18:
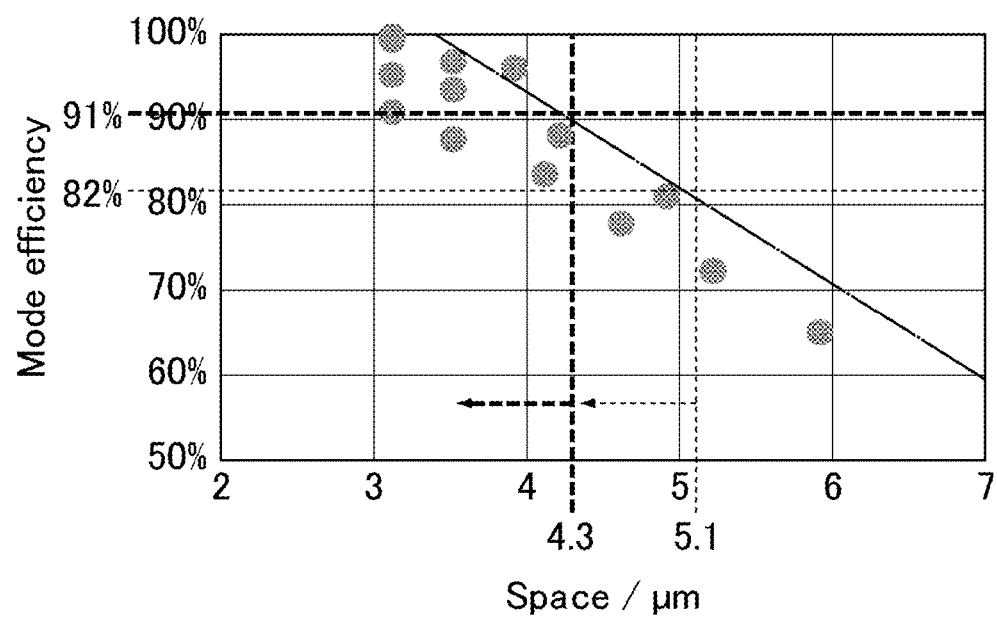
FIG. 18 is a graph showing the relationship between the width (Space) of each fine slit and the mode efficiency when the pixel pitch is 240 μm.
Figure 19:
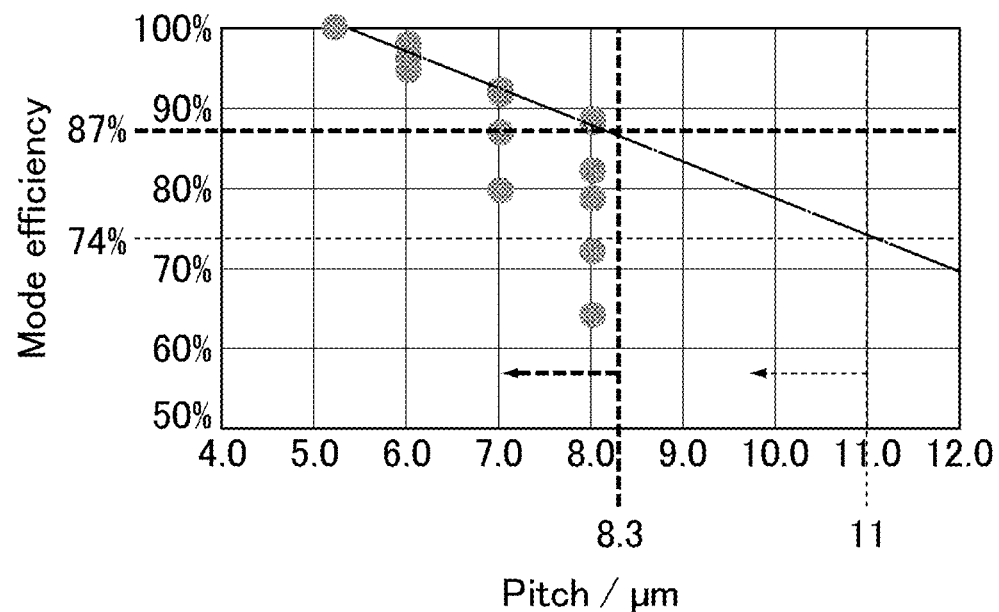
FIG. 19 is a graph showing the relationship between the pitch (Line+Space) of fine slits and the mode efficiency when the pixel pitch is 180 μm.
Figure 20:
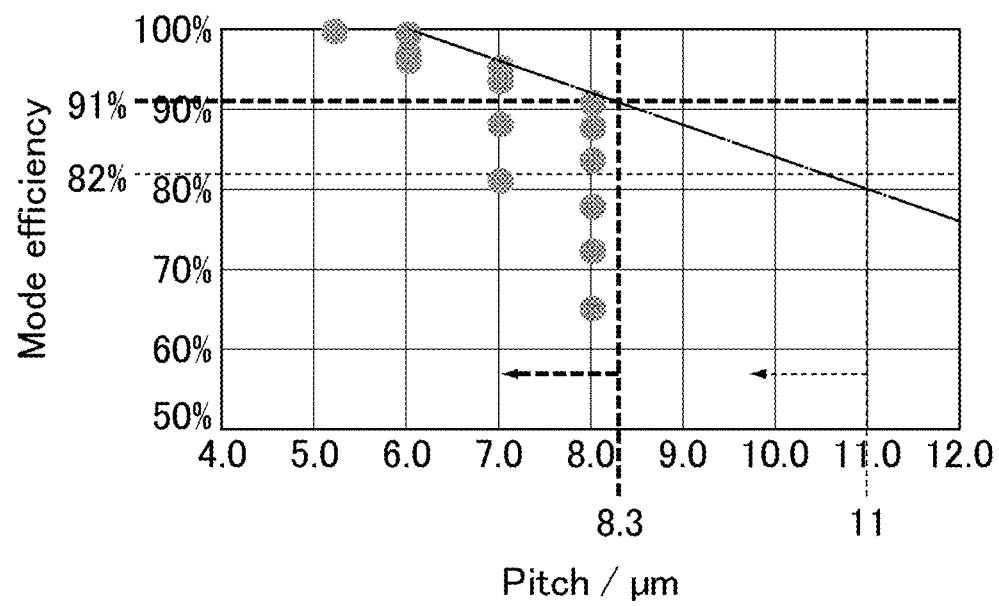
FIG. 20 is a graph showing the relationship between the pitch (Line+Space) of fine slits and the mode efficiency when the pixel pitch is 240 μm.

The graphs in FIGS. 17 to 20 were formed based on the results shown in FIGS. 15 and 16. FIG. 17 is a graph showing the relationship between the width (Space) of each fine slit 36 and the mode efficiency when the pixel pitch is 180 μm. FIG. 18 is a graph showing the relationship between the width (Space) of each fine slit 36 and the mode efficiency when the pixel pitch is 240 μm. FIG. 19 is a graph showing the relationship between the pitch (Line+Space) of the fine slits 36 and the mode efficiency when the pixel pitch is 180 μm. FIG. 20 is a graph showing the relationship between the pitch (Line+Space) of the fine slits 36 and the mode efficiency when the pixel pitch is 240 μm.

In each of the graphs in FIGS. 17 to 20, a straight line was drawn to pass through the rightmost (greatest) measurement point in the x axis (width or pitch of fine slits 36) direction, so that the width (Space) of each fine slit 36 and the pitch (Line+Space) of the fine slits 36 achieving a mode efficiency (pixel pitch 180 μm: 74%, pixel pitch 240 μm: 82%) equivalent to the case without the fine slits 36 were determined. Also, the width (Space) of each fine slit 36 and the pitch (Line+Space) of the fine slits 36 in the cases where the decreasing amount of a mode efficiency from the case with Line/Space=2.1 μm/3.1 μm is half the decreasing amount in the case without the fine slits 36 (i.e., in the cases where the mode efficiencies are 87% (pixel pitch: 180 μm) and 91% (pixel pitch: 240 μm)) were determined.

The obtained width (Line) of each electrode part between the fine slits 36 and the obtained width (Space) of each fine slit 36 showed the same tendency in the case of a pixel pitch of 180 μm and in the case of a pixel pitch of 240 μm. In other words, for a higher mode efficiency than in the case without the fine slits 36, the width (Space) of each fine slit 36 and the pitch (Line+Space) of the fine slits 36 preferably satisfy the following conditions.

Width (Space) of each fine slit 36≤5.1 μm
Pitch (Line+Space) of fine slits 36≤11 μm In order to make the decreasing amount of a mode efficiency from the case with Line/Space=2.1 μm/3.1 μm be 50% of the decreasing amount in the case without the fine slits, the width (Space) of each fine slit 36 and the pitch (Line+Space) of the fine slits 36 preferably satisfy the following conditions.

Width (Space) of each fine slit 36≤4.3 μm
Pitch (Line+Space) of fine slits 36≤8.3 μm (E) Evaluation of Electrode Pattern Near Central Slit 33

The relationship between the electrode pattern at domain boundaries and a press mark under the condition (domain boundary condition B) that the alignment vector of the second domain 10b and the alignment vector of the third domain 10c have a relationship in which the start points of the alignment vectors face each other and the alignment vectors are parallel to each other (form an angle of about) 180° was determined.

(Evaluation Method)

An evaluation cell A having the electrode pattern shown in FIG. 5 where the central slit 33 was connected to the first fine slits 36 and the second fine slits 36 and an evaluation cell B having the electrode pattern shown in FIG. 14 where an electrode connecting portion was disposed between the first fine slits 36 and the central slit 33 and between the second fine slits 36 and the central slit 33 were prepared. Each of the evaluation cells A and B had a pixel size of 60 μm×180 μm, a width (Line) of each electrode part between the fine slits 36 of 2.1 μm, and a width (Space) of each fine slit 36 of 3.1 μm.

The evaluation cells A and B with voltage applied to the pixel electrodes 31 were each pressed with a pen tip. The alignment states in the cells were observed 10 seconds after the pressing and 1 minute after the pressing.

(Evaluation Results)

The evaluation cell A having no electrode connecting portion extending parallel to the central slit 33 had no press mark 10 seconds after the pressing at the domain boundary under the domain boundary condition B. In contrast, the evaluation cell B having an electrode connecting portion extending parallel to the central slit 33 still had a press mark even one minute after the pressing at the domain boundary under the domain boundary condition B.

These results show that connecting the central slit 33 to the first fine slits 36 and the second fine slits 36 c is effective for eliminating a press mark.

(F) Evaluation of Electrode Pattern at Pixel Outer Periphery

The relationship between the electrode pattern at the pixel outer peripheries and a press mark in the evaluation cell B having the electrode pattern shown in FIG. 14 was determined.

(Evaluation Method)

Evaluation cells B1 to B8 having the following characteristics were prepared as the evaluation cells B.

Cell B1: no electrode connecting portion was disposed at the liquid crystal director head side pixel outer periphery Cell B2: electrode connecting portion had a width of 3 μm at the liquid crystal director head side pixel outer periphery Cell B3: electrode connecting portion had a width of 5 μm at the liquid crystal director head side pixel outer periphery Cell B4: electrode connecting portion had a width of 7 μm at the liquid crystal director head side pixel outer periphery Cell B5: no electrode connecting portion was disposed at the liquid crystal director tail side pixel outer periphery Cell B6: electrode connecting portion had a width of 3 μm at the liquid crystal director tail side pixel outer periphery Cell B7: electrode connecting portion had a width of 5 μm at the liquid crystal director tail side pixel outer periphery Cell B8: electrode connecting portion had a width of 7 μm at the liquid crystal director tail side pixel outer periphery In each of the cells B1 to B4, the electrode connecting portion had a width of 3 μm at the liquid crystal director tail side pixel outer periphery. In each of the cells B5 to B8, the electrode connecting portion had a width of 3 μm at the liquid crystal director head side pixel outer periphery.

Each of the cells B1 to B8 had a pixel size of 60 μm×180 μm, a width (Line) of each electrode part between the fine slits 36 of 2.1 μm, and a width (Space) of each fine slit 36 of 3.1 μm.

Each of the cells B1 to B8 with voltage applied to the pixel electrodes 31 was pressed with a pen tip. The alignment states in the cells were observed 10 seconds after the pressing.

(Evaluation Results)

The cell B1 having no electrode connecting portion at the liquid crystal director head side pixel outer periphery had a significant alignment disorder. In contrast, the cells B2, B3, and B4 having an electrode connecting portion reduced or eliminated alignment disorders. In particular, the cell B2 whose electrode connecting portion had a width of 3 μm most reduced or eliminated alignment disorders.

The cells B5, B6, B7, and B8 had no alignment disorders. These results show that the presence of an electrode connecting portion on the liquid crystal director tail side and the width of the electrode connecting portion do not affect alignment disorders after the pressing.

(G) Consideration on Slit Size

Cells were prepared by changing the following sizes (1) to (3) of the evaluation cell A having the electrode pattern shown in FIG. 5. The luminance in a micrograph of each cell was analyzed to determine the dark line generation level.

(1) Width of central slit 33 (distance between fine slit ends on capacitance line CS in central portion of pixel)

(2) Distance between fine slit ends at boundary between first domain 10a and second domain 10b and boundary between third domain 10c and fourth domain 10d (domain boundary condition A)

(3) Distance between pixel electrode end along source signal line S and slit end (Evaluation Results)

Figure 21:
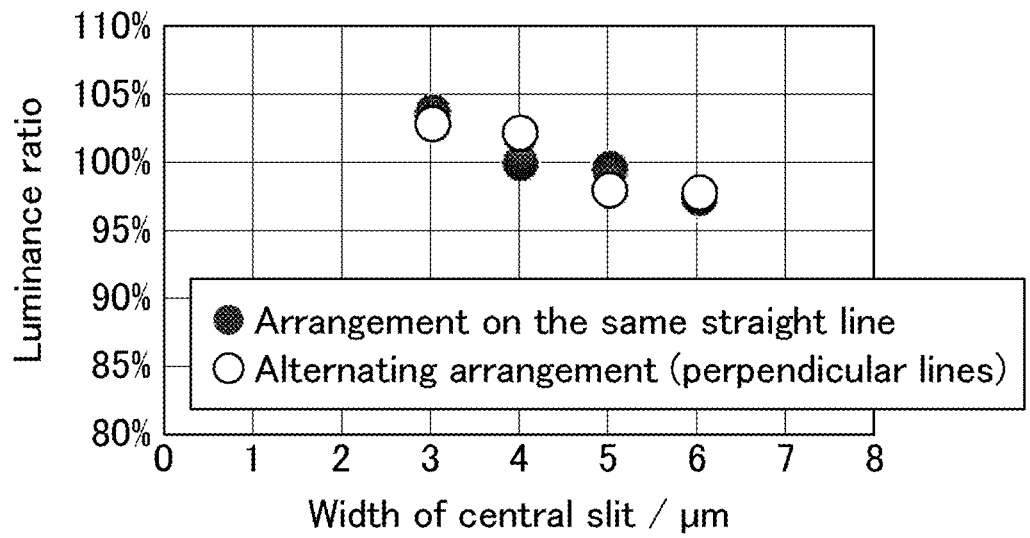
FIG. 21 is a graph showing the relationship between the central slit width and the luminance ratio.

FIG. 21 is a graph showing the relationship between the central slit 33 width and the luminance ratio. The graph of FIG. 21 shows that a smaller width of the central slit 33 tends to give a higher luminance. The difference in luminance was small between the case where the fine slits of adjacent domains are arranged on the same straight line and the cases where the fine slits are arranged alternately.

Figure 22A:
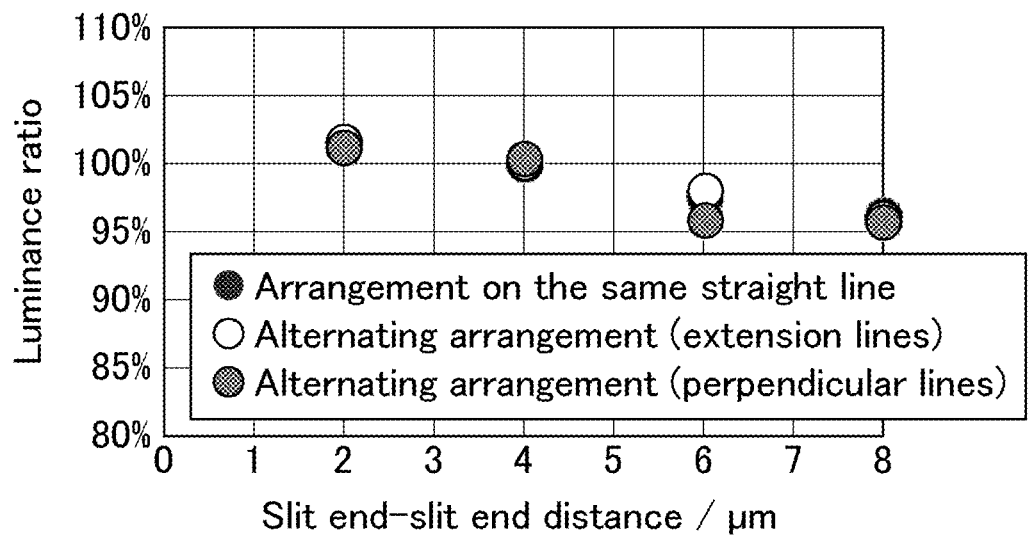
FIG. 22A is a graph showing the relationship between the distance between fine slit ends (slit end-slit end distance) and the luminance ratio under the domain boundary condition A.

FIG. 22A is a graph showing the relationship between the distance between fine slit ends (slit end-slit end distance) and the luminance ratio under the domain boundary condition A. The graph of FIG. 22A shows that a smaller slit end-slit end distance under the domain boundary condition A tends to give a higher luminance, although the change was small. The difference in luminance was small between the case where the fine slits of adjacent domains are arranged on the same straight line and the cases where the fine slits are arranged alternately. The cases where the fine slits are arranged alternately include the following two patterns.

<Pattern 1: "Alternating Arrangement (Extension Lines)">

Figure 22B:
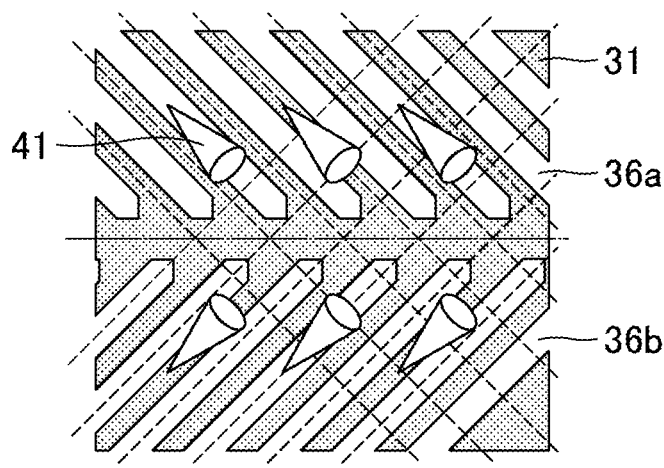
FIG. 22B is a view illustrating "alternating arrangement (extension lines)" in FIG. 22A.

The design shown in FIG. 22B in which the extension lines of the fine slits cross the extension lines of the electrode parts between the fine slits 36 in the adjacent domain.

<Pattern 2: "alternating Arrangement (Perpendicular Lines)">

Figure 22C:
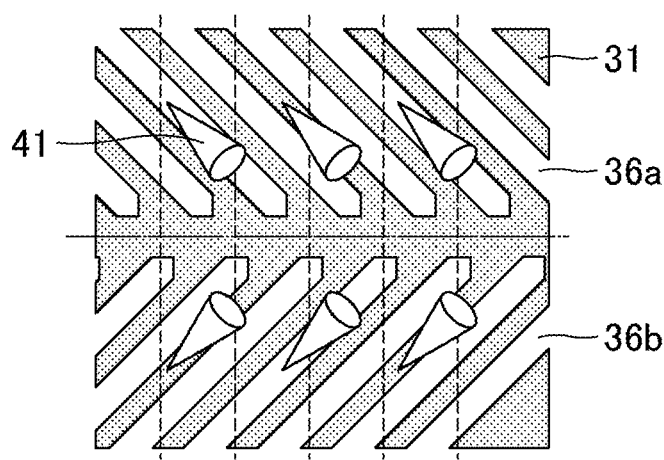
FIG. 22C is a view illustrating "alternating arrangement (perpendicular lines)" in FIG. 22A.

The design shown in FIG. 22C in which the perpendicular lines drawn from the fine slits in the domain boundary direction cross the electrode parts between the fine slits 36 in the adjacent domain.

Figure 23:
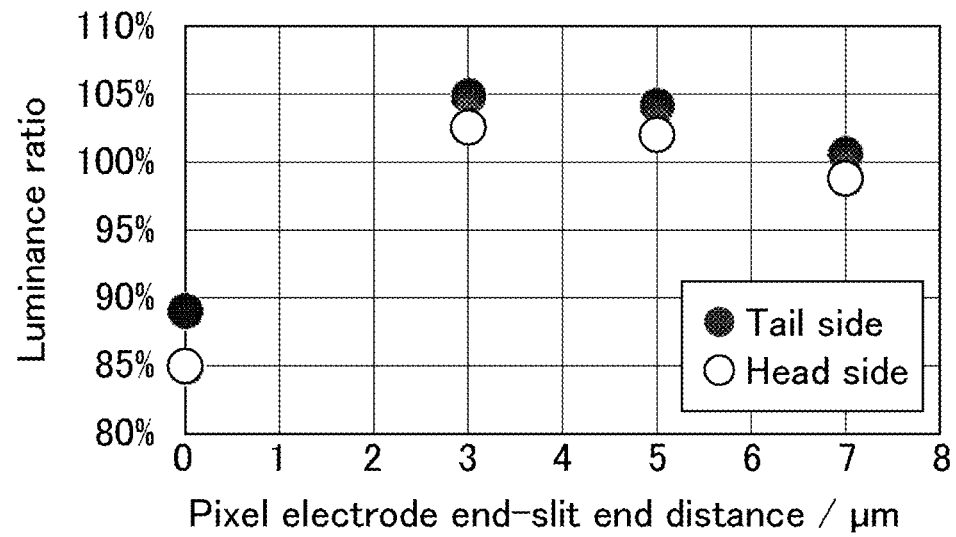
FIG. 23 is a graph showing the relationship between the distance between a pixel electrode end along a source signal line S and a slit end (pixel electrode end-slit end distance) and the luminance ratio.

FIG. 23 is a graph showing the relationship between the distance between a pixel electrode end along a source signal line S and a slit end (pixel electrode end-slit end distance) and the luminance ratio. The graph of FIG. 23 shows that the change in luminance caused by the distance between the pixel electrode end along the source signal line and the slit end was large, and the optimal value was 3 to 4 µm.

These results show that the structure with the central slit 33 having a width of 3 µm and a slit end-slit end distance of 2 µm can achieve a luminance that is 1.05 times the luminance achieved by the structure with the central slit 33 having a width of 4 µm and a slit end-slit end distance of 4 µm.

(H) Electrode Pattern Condition in Consideration of Measure Against Pressing and Dark Line Portion Luminance The results of the evaluations (E), (F), and (G) and the other information suggested that the appropriate electrode pattern conditions in terms of the measure against pressing and the dark line portion luminance are as follows.

The central slit 33 connected to the first fine slits 36b and the second fine slits 36 is formed at the boundary between the second domain 10b and the third domain 10c (domain boundary condition B). In terms of the transmittance, the width of the central slit 33 (distance between the electrode end of the second domain 10b and the electrode end of the third domain 10c) is preferably 3 to 4 µm.

No electrode connecting portion extending parallel to the central slit 33 is formed at the boundary between the second domain 10b and the third domain 10c (domain boundary condition B).

The distance between the ends of the fine slits 36 at the boundary between the first domain 10a and the second domain 10b and the boundary between the third domain 10c and the fourth domain 10d (domain boundary condition A) is preferably 1 to 3 µm.

The width of the electrode connecting portion 35 along the source signal line S on the liquid crystal director head side (distance between pixel electrode end and slit end) is preferably 2 to 4 µm. A large alignment disorder is generated when no electrode connecting portion 35 is formed or when the electrode connecting portion 35 has a very large thickness.

The presence or absence of the electrode connecting portion 35 leads to no significant difference and finger pressing has not much influence at the pixel electrode end along the source signal line S on the liquid crystal director tail side and the pixel electrode end along the gate signal line G. In terms of the transmittance, the width of the electrode connecting portion 35 along the source signal line S on the liquid crystal director tail side (distance between pixel electrode end and slit end) is preferably 3 to 5 µm. The width of the electrode connecting portion 35 along the gate signal line G on the liquid crystal director tail side (distance between pixel electrode end and slit end) is preferably 3 µm or greater, such as 5 to 7 µm, for reduction or elimination of the influence of the gate electric field.

(J) Evaluation of Pixel Electrode Slit Condition in Consideration of Press Mark Elimination In order to determine the relationship between press mark elimination and the fine slits of a pixel electrode, cells were prepared by changing the fine slit size of the evaluation cell A having the electrode pattern shown in FIG. 5. Each cell was pressed with a force of 3 N or 10 N using a push-pull gauge. Whether or not the press mark disappears within one minute was evaluated.

(Evaluation Results)

Figure 24:
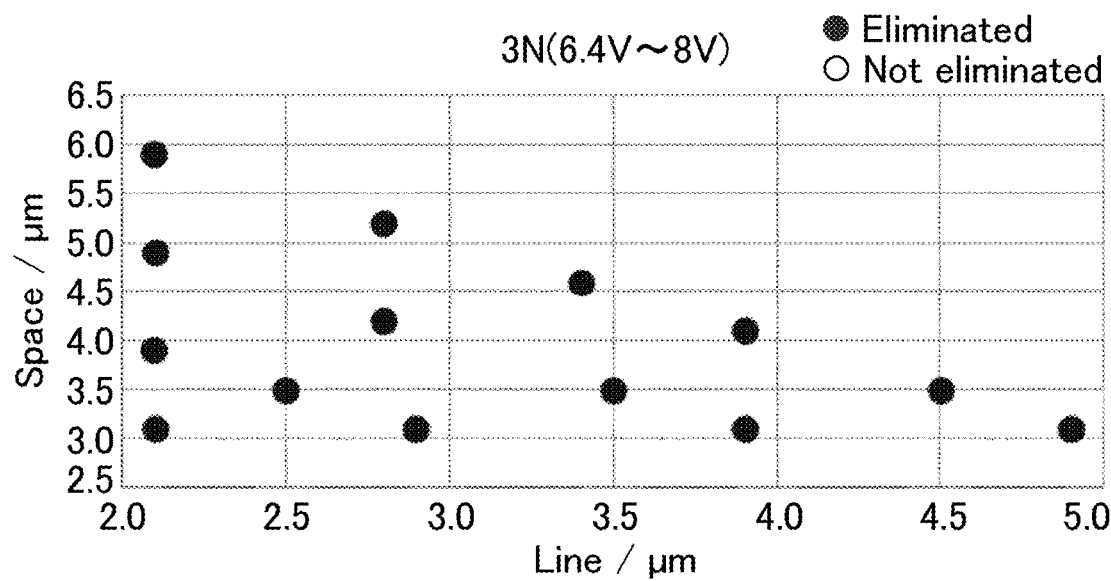
FIG. 24 is a graph showing whether or not a press mark formed by pressing with a force of 3 N when a voltage of 6.4 V to 8 V is applied to the pixel electrode can be eliminated, based on the relationship between the width (Line) of each electrode part between fine slits 36 and the width (Space) of each fine slit 36.
Figure 25:
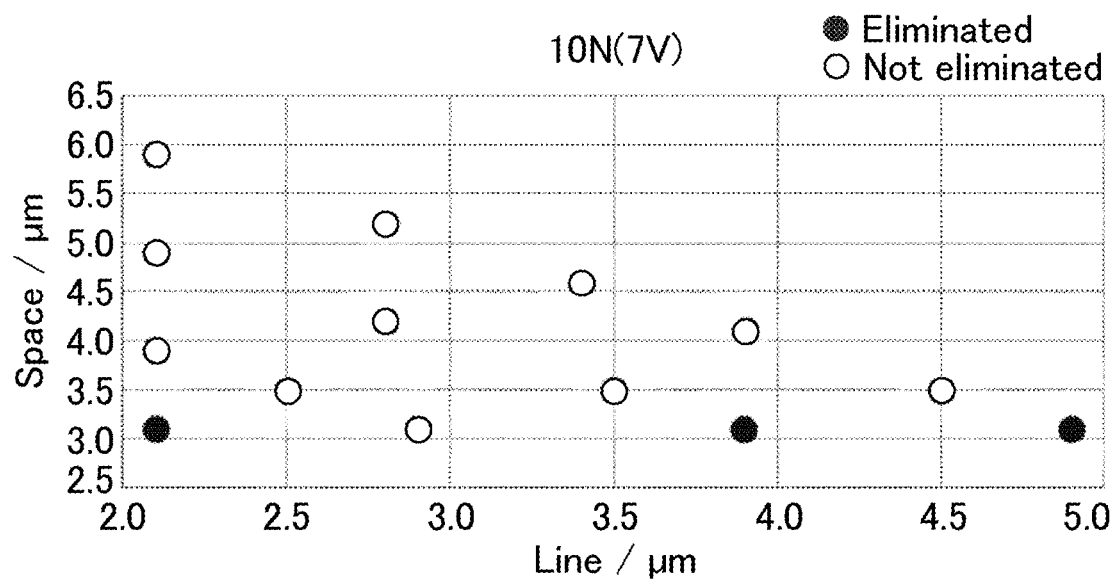
FIG. 25 is a graph showing whether or not a press mark formed by pressing with a force of 10 N when a voltage of 7 V is applied to the pixel electrode can be eliminated, based on the relationship between the width (Line) of each electrode part between fine slits 36 and the width (Space) of each fine slit 36.
Figure 26:
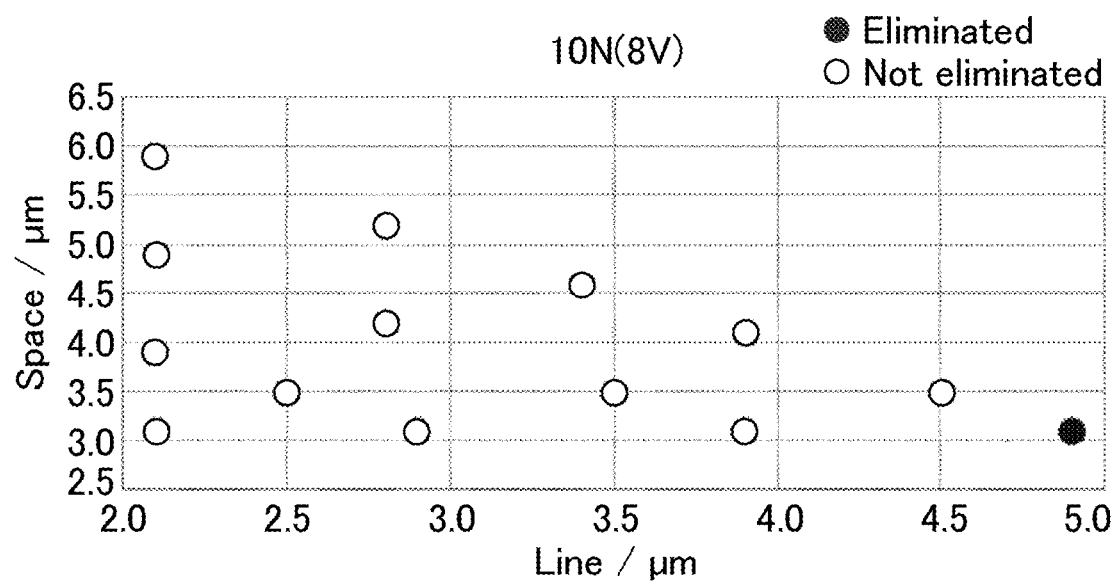
FIG. 26 is a graph showing whether or not a press mark formed by pressing with a force of 10 N when a voltage of 8 V is applied to the pixel electrode can be eliminated, based on the relationship between the width (Line) of each electrode part between fine slits 36 and the width (Space) of each fine slit 36.

FIG. 24 is a graph showing whether or not a press mark formed by pressing with a force of 3 N when a voltage of 6.4 V to 8 V is applied to the pixel electrode can be eliminated, based on the relationship between the width (Line) of each electrode part between fine slits 36 and the width (Space) of each fine slit 36. FIG. 25 is a graph showing whether or not a press mark formed by pressing with a force of 10 N when a voltage of 7 V is applied to the pixel electrode can be eliminated, based on the relationship between the width (Line) of each electrode part between fine slits 36 and the width (Space) of each fine slit 36. FIG. 26 is a graph showing whether or not a press mark formed by pressing with a force of 10 N when a voltage of 8 V is applied to the pixel electrode can be eliminated, based on the relationship between the width (Line) of each electrode part between fine slits 36 and the width (Space) of each fine slit 36.

Figure 27:
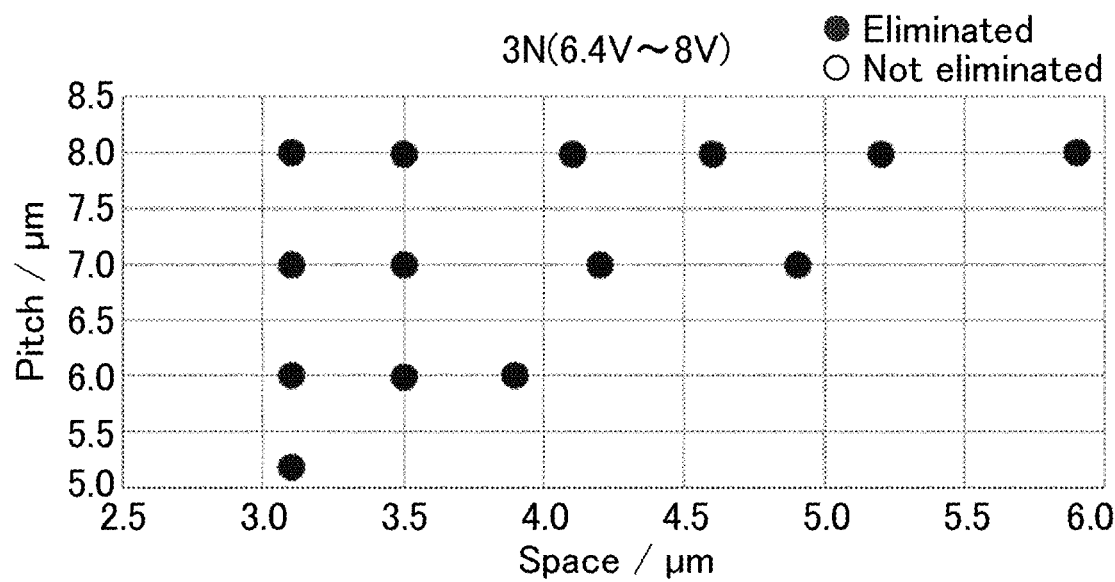
FIG. 27 is a graph showing whether or not a press mark formed by pressing with a force of 3 N when a voltage of 6.4 V to 8 V is applied to the pixel electrode can be eliminated, based on the relationship between the width (Space) of each fine slit 36 and the pitch (Pitch=Line+Space) of the fine slits 36.
Figure 28:
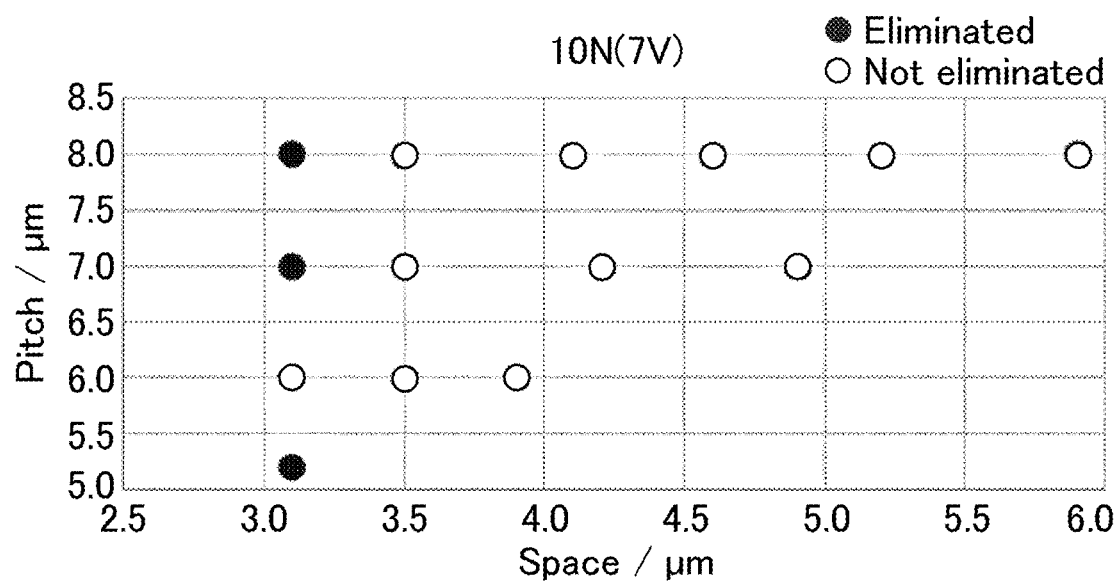
FIG. 28 is a graph showing whether or not a press mark formed by pressing with a force of 10 N when a voltage of 7 V is applied to the pixel electrode can be eliminated, based on the relationship between the width (Space) of each fine slit 36 and the pitch (Pitch=Line+Space) of the fine slits 36.
Figure 29:
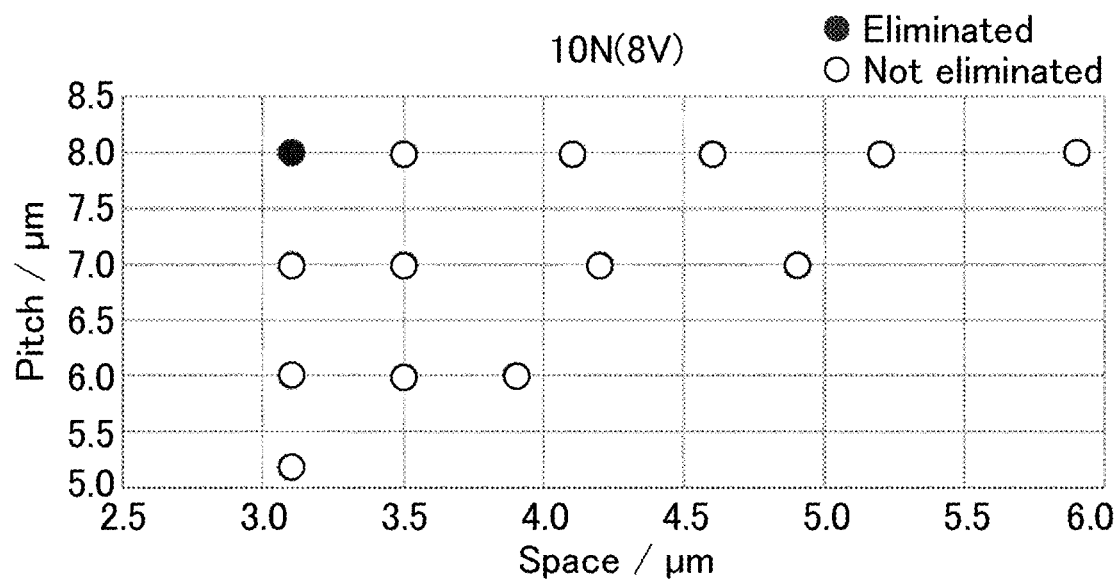
FIG. 29 is a graph showing whether or not a press mark formed by pressing with a force of 10 N when a voltage of 8 V is applied to the pixel electrode can be eliminated, based on the relationship between the width (Space) of each fine slit 36 and the pitch (Pitch=Line+Space) of the fine slits 36.

FIG. 27 is a graph showing whether or not a press mark formed by pressing with a force of 3 N when a voltage of 6.4 V to 8 V is applied to the pixel electrode can be eliminated, based on the relationship between the width (Space) of each fine slit 36 and the pitch (Pitch=Line+Space) of the fine slits 36. FIG. 28 is a graph showing whether or not a press mark formed by pressing with a force of 10 N when a voltage of 7 V is applied to the pixel electrode can be eliminated, based on the relationship between the width (Space) of each fine slit 36 and the pitch (Pitch=Line+Space) of the fine slits 36. FIG. 29 is a graph showing whether or not a press mark formed by pressing with a force of 10 N when a voltage of 8 V is applied to the pixel electrode can be eliminated, based on the relationship between the width (Space) of each fine slit 36 and the pitch (Pitch=Line+Space) of the fine slits 36.

The graphs of FIGS. 24 to 29 show that the pressing with a force of 3 N tends not to leave a press mark, but pressing with a force of 10 N tends to leave a press mark. Also, a press mark tends to remain when the width (Space) of each fine slit 36 is large and when the applied voltage is high. Although not shown in the graphs, no press mark remained at an intermediate voltage (2.2 to 3.5 V). When the applied voltage was temporarily lowered to voltage for black image (black image was displayed) on the liquid crystal panel with a residual press mark and then the applied voltage was increased to the previous level again, the press mark disappeared and the liquid crystal molecules returned to the initial alignment state.

MODIFIED EXAMPLE

Figure 30:
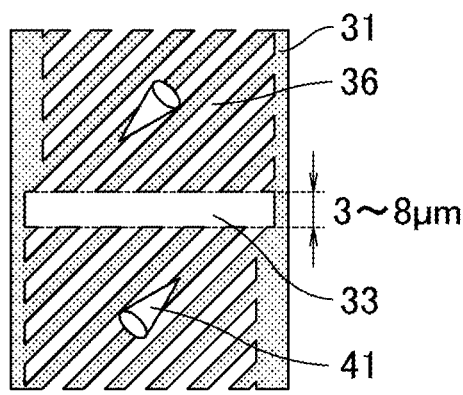
FIG. 30 is a plan view showing exemplary shape and size of a central slit 33.
Figure 31A:
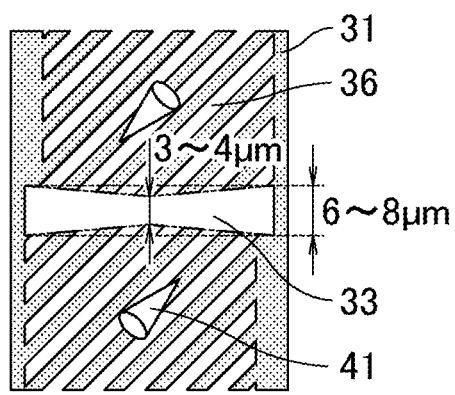
FIG. 31A is a plan view showing exemplary shape and size of a central slit 33 with a wide end at each side.
Figure 31B:
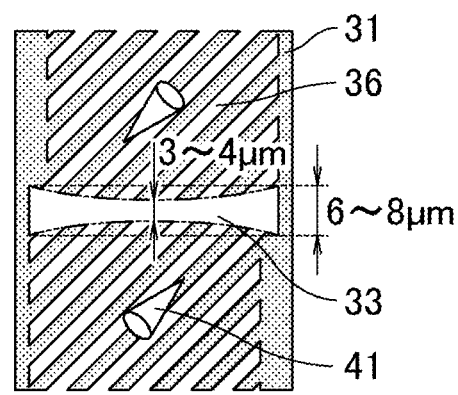
FIG. 31B is a plan view showing other exemplary shape and size of the central slit 33 with a wide end at each side.
Figure 31C:
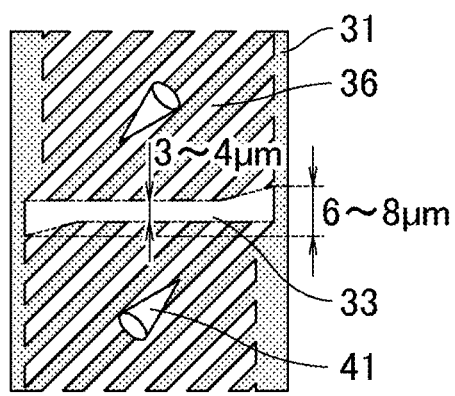
FIG. 31C is a plan view showing yet other exemplary shape and size of the central slit 33 with a wide end at each side.
Figure 31D:
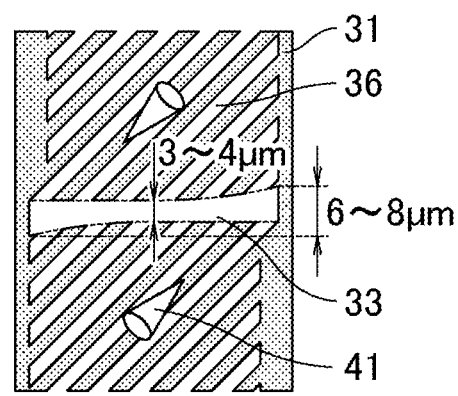
FIG. 31D is a plan view showing yet other exemplary shape and size of the central slit 33 with a wide end at each side.
Figure 32A:
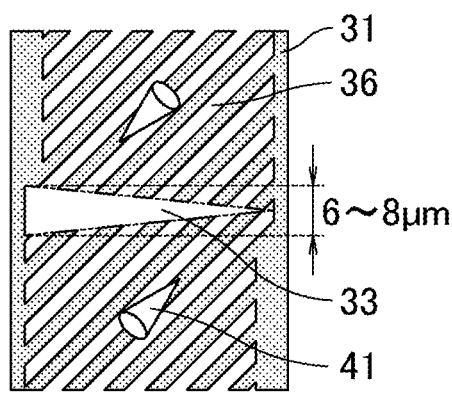
FIG. 32A is a plan view showing exemplary shape and size of the central slit 33 with a wide end at one side.
Figure 32B:
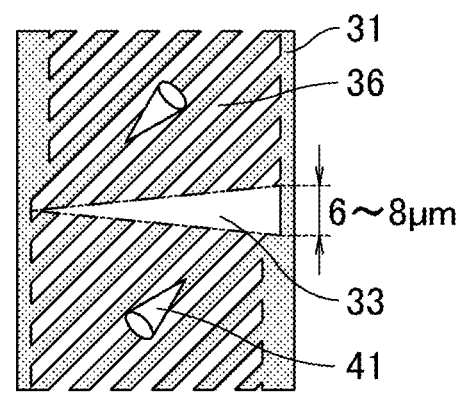
FIG. 32B is a plan view showing other exemplary shape and size of the central slit 33 with a wide end at one side.
Figure 33A:
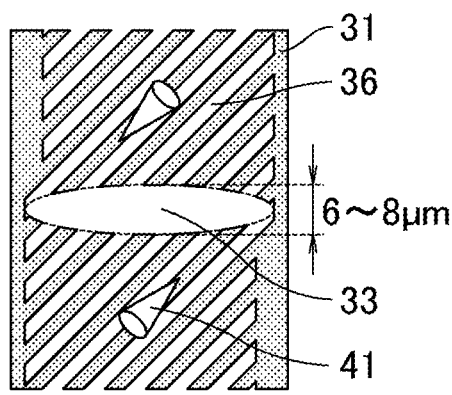
FIG. 33A is a plan view showing exemplary shape and size of the central slit 33 with a wide central portion.
Figure 33B:
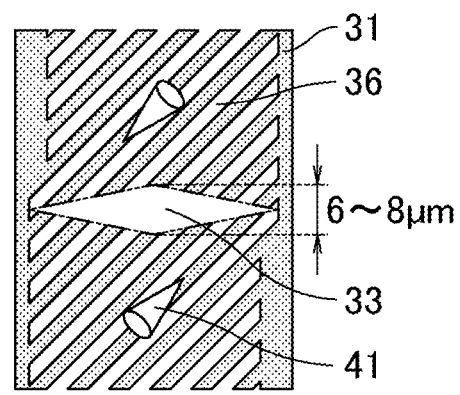
FIG. 33B is a plan view showing other exemplary shape and size of the central slit 33 with a wide central portion.
Figure 33C:
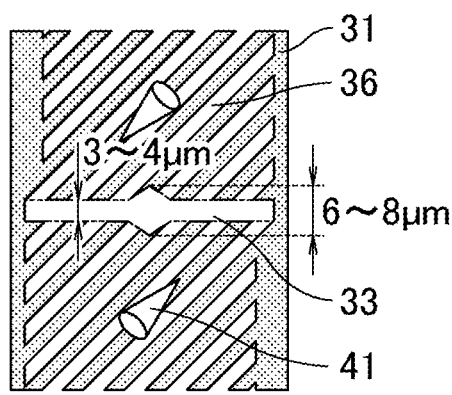
FIG. 33C is a plan view showing yet other exemplary shape and size of the central slit 33 with a wide central portion.
Figure 33D:
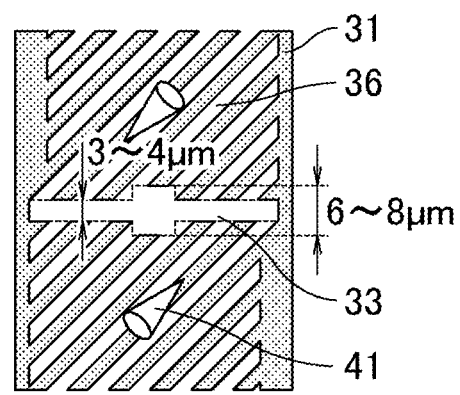
FIG. 33D is a plan view showing yet other exemplary shape and size of the central slit 33 with a wide central portion.
Figure 33E:
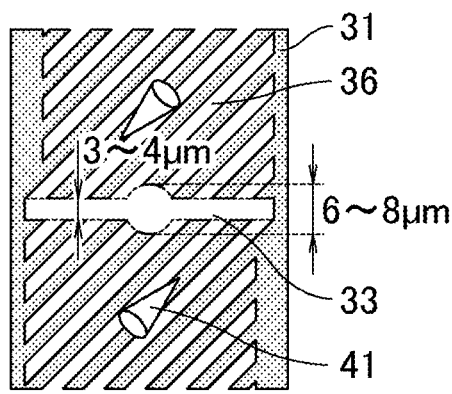
FIG. 33E is a plan view showing yet other exemplary shape and size of the central slit 33 with a wide central portion.
Figure 34A:
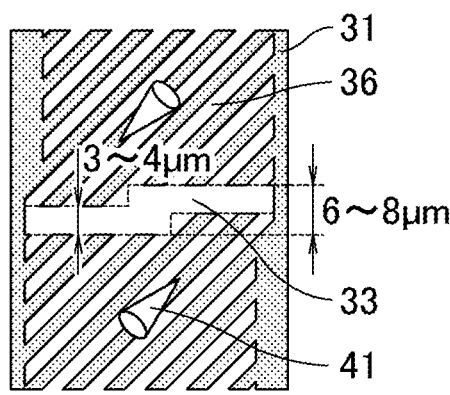
FIG. 34A is a plan view showing exemplary shape and size of the central slit 33 with a wide central portion formed by a vertical shift.
Figure 34B:
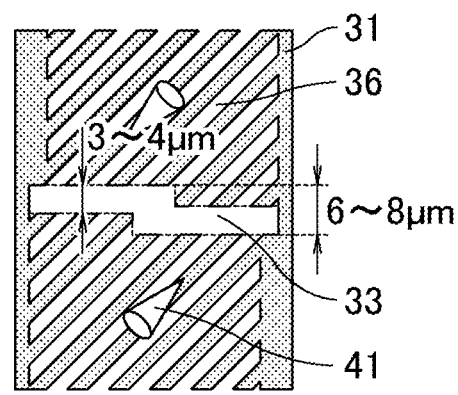
FIG. 34B is a plan view showing other exemplary shape and size of the central slit 33 with a wide central portion formed by a vertical shift.
Figure 35:
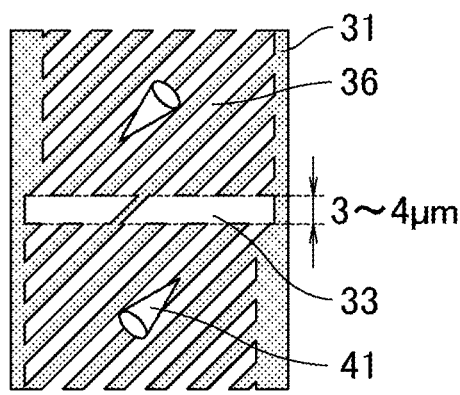
FIG. 35 is a plan view showing exemplary shape and size of the central slit 33 with a divided portion.

The shape and size of the central slit 33 may appropriately be changed in the present invention. For example, as well as the shape shown in FIG. 30, the shapes with a wide end at each side as shown in FIGS. 31A, 31B, 31C, and 31D, the shapes with a wide end at one side as shown in FIGS. 32A and 32B, the shapes with a wide central portion as shown in FIGS. 33A, 33B, 33C, 33D, and 33E, the shapes with a wide central portion formed by a vertical shift as shown in FIGS. 34A and 34B, and the shape with a divided portion as shown in FIG. 35 are possible. The shapes with a wide end at each side can keep the singular point (intersection of double dark lines) with an inconstant alignment direction at either one end of the electrode slit. The structures with a wide end at one side or the structures with a wide central portion can fix the singular point in one wide portion, reducing or eliminating variation in position of the singular point in pixels. The structures with a divided portion can keep the singular point in the divided portion.

The dark line width is considered not to depend on the pixel pitch. Thus, the width of the central slit 33 may be set without consideration on the pixel pitch.

What is claimed is:

1. A liquid crystal panel sequentially comprising:
   a first substrate including pixel electrodes and a first alignment film;
   a liquid crystal layer containing liquid crystal molecules; and
   a second substrate including a common electrode and a second alignment film, wherein
   the first alignment film and the second alignment film having been subjected to an alignment treatment such that pixels each include domains with different alignment vectors in a column direction, each of the alignment vectors extending from a first substrate side long-axis end of each of the liquid crystal molecules serving as a start point to a second substrate side long-axis end of the liquid crystal molecule serving as an end point,
   the domains are arranged in a same order in at least 30 pixels consecutive in a row direction and including a first domain, a second domain, a third domain, and a fourth domain sequentially arranged in the column direction,
   each of the pixel electrodes includes a conductive portion in the first domain, the second domain, the third domain, and the fourth domain, and a plurality of slits,
   the plurality of slits includes first fine slits in the second domain, second fine slits in the third domain, third fine slits in the first domain, fourth fine slits in the fourth domain, and a central slit extending along a boundary between the second domain and the third domain at the boundary,
   the first fine slits extend parallel to the alignment vector of the second domain, the second fine slits extend parallel to the alignment vector of the third domain, the central slit extends along the boundary between the second domain and the third domain, the third fine slits extend parallel to the alignment vector of the first domain, and the fourth fine slits extend parallel to the alignment vector of the fourth domain,
   the plurality of slits are surrounded by the conductive portion of each of the pixel electrodes, and at least one of the first fine slits and the second fine slits is connected via the central slit, and
   a width of the conductive portion between an outer edge of the pixel electrode and a first end of each slit of the first fine slits and the second fine slits is larger than a width of the conductive portion between the outer edge of the pixel electrode and a second end of each slit of the first fine slits and the second fine slits, and the first end of each slit of the first fine slits and the second fine slits is located on a side closer to the start point of the alignment vector in a corresponding domain and the second end of each slit of the first fine slits and the second fine slits is located on a side closer to the end point of the alignment vector in the corresponding domain.

2. The liquid crystal panel according to claim 1, wherein the conductive portion of each of the pixel electrodes include an electrode connecting portion connecting electrode portions between the first fine slits and the second fine slits, in an outer peripheral region on an end point side of each of the alignment vectors.

3. The liquid crystal panel according to claim 1, wherein in a plan view of the domains,
   the end points of the alignment vector of the first domain and the alignment vector of the second domain oppose each other and the alignment vector of the first domain and the alignment vector of the second domain are perpendicular to each other,
   the start points of the alignment vector of the second domain and the alignment vector of the third domain oppose each other and the alignment vector of the second domain and the alignment vector of the third domain are parallel to each other, and
   the end points of the alignment vector of the third domain and the alignment vector of the fourth domain oppose each other and the alignment vector of the third domain and the alignment vector of the fourth domain are perpendicular to each other.

4. The liquid crystal panel according to claim 1, wherein the liquid crystal molecules are aligned in a direction substantially perpendicular to the first substrate and the second substrate when no voltage is applied to the liquid crystal layer, and
   the liquid crystal molecules are aligned such that the liquid crystal molecules are tilted to match the alignment vector of a corresponding domain.

5. The liquid crystal panel according to claim 1, wherein in each of the domains, the liquid crystal molecules form a twist angle of 45° or less between the first substrate and the second substrate.

6. The liquid crystal panel according to claim 1, wherein the first substrate includes a capacitance line overlapping with the central slit.

7. The liquid crystal panel according to claim 1, wherein the central slit extends in the row direction along the boundary between the second domain and the third domain.

8. The liquid crystal panel according to claim 1, wherein the central slit has a different width at a central portion than at each of first end portions in the row direction.

9. The liquid crystal panel according to claim 8, wherein the width of central portion of the central slit is larger than the width of each of the first end portions.

10. The liquid crystal panel according to claim 8, wherein the width of the central portion of the central slit is smaller than the width of each of the first end portions.

11. The liquid crystal panel according to claim 1, wherein the central slit has a symmetrical shape with respect to the column direction.

12. The liquid crystal panel according to claim 1, wherein the central slit includes first end portions in the row direction, and the first end portions are surrounded by the conductive portion of each of the pixel electrodes.

13. The liquid crystal panel according to claim 12, wherein the central slit has a rectangular shape.

14. The liquid crystal panel according to claim 12, wherein the central slit includes second end portions in the column direction, and the second end portions are surrounded by the conductive portion of each of the pixel electrodes.

15. The liquid crystal panel according to claim 12, wherein the central slit includes second end portions in the column direction, and the second end portions are surrounded by the first fine slits and the second fine slits.

16. The liquid crystal panel according to claim 1, wherein the central slit includes a plurality of portions which have a rectangular shape and extend along the boundary between the second domain and the third domain.

* * * * *